United States Patent
Yamazaki

(10) Patent No.: US 12,030,323 B2
(45) Date of Patent: Jul. 9, 2024

(54) INTERFACE CIRCUIT AND THERMAL HISTORY CONTROL METHOD

(71) Applicant: KYOCERA CORPORATION, Kyoto (JP)

(72) Inventor: Takenori Yamazaki, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 99 days.

(21) Appl. No.: 17/906,972

(22) PCT Filed: Aug. 21, 2020

(86) PCT No.: PCT/JP2020/031742
§ 371 (c)(1),
(2) Date: Sep. 21, 2022

(87) PCT Pub. No.: WO2021/192347
PCT Pub. Date: Sep. 30, 2021

(65) Prior Publication Data
US 2023/0089133 A1 Mar. 23, 2023

(30) Foreign Application Priority Data
Mar. 25, 2020 (JP) .................... 2020-055143

(51) Int. Cl.
*B41J 2/355* (2006.01)
*B41J 2/36* (2006.01)
(Continued)

(52) U.S. Cl.
CPC ............ *B41J 2/3555* (2013.01); *B41J 2/355* (2013.01); *B41J 2/36* (2013.01); *B41J 2/365* (2013.01);
(Continued)

(58) Field of Classification Search
CPC ... B41J 2/3555; B41J 2/355; B41J 2/36; B41J 2/365; B41J 2/375; H04N 1/23; H04N 1/32
See application file for complete search history.

(56) References Cited

U.S. PATENT DOCUMENTS 5,719,615 A * 2/1998 Hashiguchi ................ B41J 2/36
347/195
5,946,020 A * 8/1999 Rogers ....................... B41J 2/36
347/193
(Continued)

FOREIGN PATENT DOCUMENTS

EP  1266762 A2  12/2002
JP  2006305859 A  11/2006

*Primary Examiner* — Henok D Legesse
(74) *Attorney, Agent, or Firm* — HAUPTMAN HAM, LLP

(57) ABSTRACT

An interface circuit includes an operation controller that controls an operation state of the interface circuit; a converter that outputs divided print data signals, each divided print data signal of the divided print data signals having a predetermined bit width; a storage that stores the divided print data signals. The interface circuit includes a data controller that controls an order of writing of the divided print data signals into the storage and reading of the divided print data signals from the storage; a logical arithmetic module that performs logical arithmetic operations based on the divided print data signal and a history pulse signal and outputs a history print data signal that defines heat generating time periods of dots corresponding to print lines to be printed; and a conversion clock synchronizer that outputs the history print data signal in synchronization with a driving signal for a thermal head.

8 Claims, 19 Drawing Sheets

(51) Int. Cl.
  *B41J 2/365* (2006.01)
  *B41J 2/375* (2006.01)
  *H04N 1/23* (2006.01)
  *H04N 1/32* (2006.01)

(52) U.S. Cl.
  CPC .............. *B41J 2/375* (2013.01); *H04N 1/23* (2013.01); *H04N 1/32* (2013.01)

(56) References Cited

U.S. PATENT DOCUMENTS

| | | |
|---|---|---|
| 6,606,108 B2 | 8/2003 | Lee |
| 7,802,857 B2 | 9/2010 | Imai |
| 2002/0021349 A1* | 2/2002 | Lee .................. B41J 2/365 347/195 |
| 2007/0041766 A1* | 2/2007 | Imai .................. B41J 2/355 400/120.01 |

* cited by examiner

FIG.15

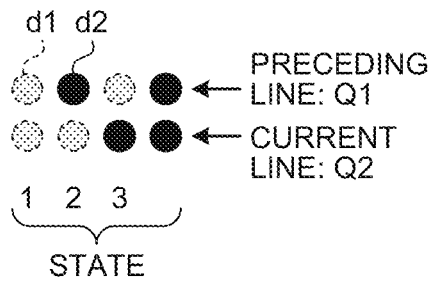

HISTORY PULSE SIGNAL:
CONT1 TO CONT4

PRECEDING LINE: Q1
CURRENT LINE: Q2

STATE

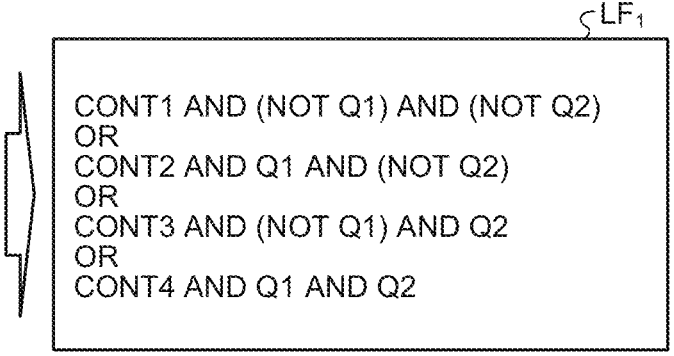

CONT1 AND (NOT Q1) AND (NOT Q2)
OR
CONT2 AND Q1 AND (NOT Q2)
OR
CONT3 AND (NOT Q1) AND Q2
OR
CONT4 AND Q1 AND Q2

FIG.16

HQ =
CONT1 AND Q1 AND (NOT Q2) AND (NOT Q3) AND NOT (BQ1 OR BQ2)
OR
CONT2 AND Q1 AND (NOT Q2) AND Q3 AND NOT (BQ1 OR BQ2)
OR
CONT3 AND Q1 AND Q2 AND (NOT Q3) AND NOT (BQ1 OR BQ2)
OR
CONT4 AND Q1 AND Q2 AND Q3 AND NOT (BQ1 OR BQ2)
OR
CONT5 AND Q1 AND (NOT Q2) AND (NOT Q3) AND (BQ1 OR BQ2)
OR
CONT6 AND Q1 AND (NOT Q2) AND Q3 AND (BQ1 OR BQ2)
OR
CONT7 AND Q1 AND Q2 AND (NOT Q3) AND (BQ1 OR BQ2)
OR
CONT8 AND Q1 AND Q2 AND Q3 AND (BQ1 OR BQ2)

FIG.19

CQ = Q1 AND Q2 OR Q3 AND (Q1 XOR Q2)  ⸜LF₃

SHIFT REGISTER (FF1 ⇒ FFn) 1100110011001 ...

FIG.24
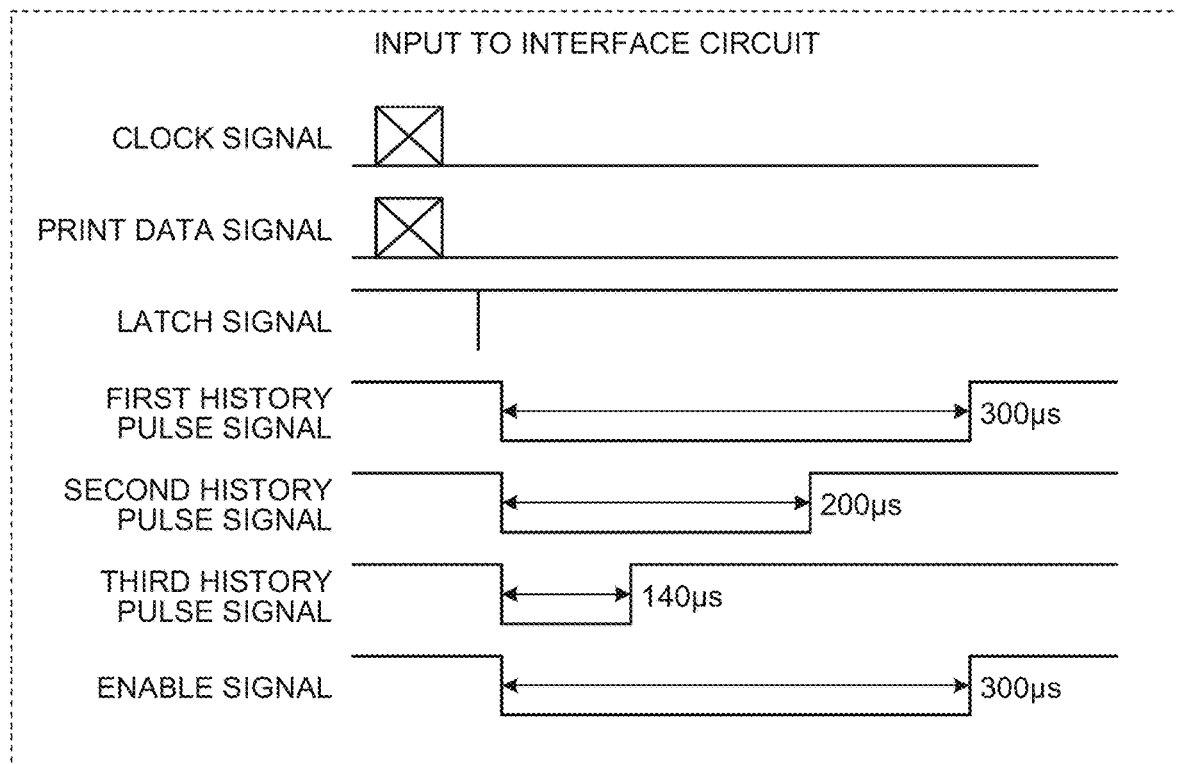
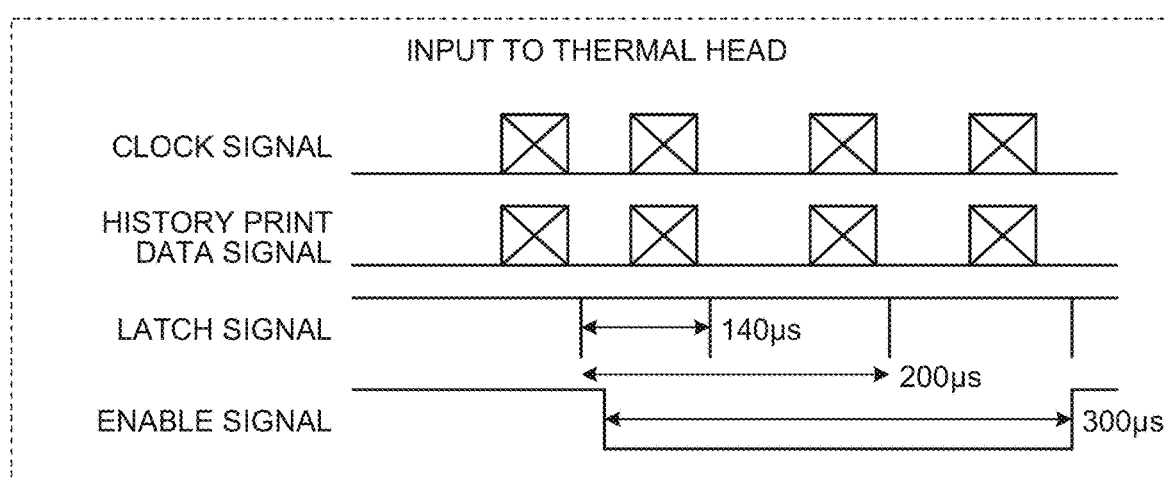

FIG.27

| | CIRCUIT SIZE (NUMBER OF LE) | | MEMORY SIZE | DATA CONVERSION SPEED | DATA CONVERSION TECHNIQUE | EXTERNAL SIGNAL RESPONDING SPEED | FLEXIBILITY OF CIRCUIT ACCORDING TO CHANGE IN NUMBER OF DOTS |
|---|---|---|---|---|---|---|---|
| | 640 DOTS | 1920 DOTS | | | | | |
| COMPARATIVE EXAMPLE | 1000 | 2200 | 3840 | LIMITED | PARALELL PROCESSING NOT POSSIBLE | ARITHMETIC OPERATION TIME PERIOD + DATA TRANSFER TIME PERIOD | NEEDED |
| EMBODIMENT | 900 | 900 | 3200 | NOT LIMITED | PARALELL PROCESSING POSSIBLE | ARITHMETIC OPERATION TIME PERIOD | NOT NEEDED |

INTERFACE CIRCUIT AND THERMAL HISTORY CONTROL METHOD

RELATED APPLICATIONS

The present application is a National Phase of International Application No. PCT/JP2020/031742, filed Aug. 21, 2020, and claims priority based on Japanese Patent Application No. 2020-055143, filed Mar. 25, 2020.

FIELD

Embodiments of the disclosure relate to interface circuits and thermal history control methods.

BACKGROUND

Thermal printers that perform thermal history control for the purpose of reducing influence of heat accumulation due to past print operation have been known conventionally. In heat history control, dot images of lines printed in the past are stored and the application time period for a heating element in a thermal head is controlled on the basis of the dot images.

CITATION LIST

Patent Literature

Patent Literature 1: Japanese Patent Application Laid-open No. 2006-305859

SUMMARY

An interface circuit according to one aspect of embodiments that: is connected to both, a system controller that controls a system of a thermal printer, and a driving circuit that controls driving of a heat generating element installed in a thermal head, and that transfers a print data signal and a control signal output from the system controller, to the driving circuit, the interface circuit including: an operation controller that controls an operation state of the interface circuit; a converter that outputs divided print data signals resulting from division of the print data signal into the divided print data signals each divided print data signal of the divided print data signals having a predetermined bit width; a storage that stores the divided print data signals; a data controller that controls an order of each of writing of the divided print data signals into the storage and reading of the divided print data signals from the storage; a logical arithmetic module that performs logical arithmetic operations based on the divided print data signals, and a history pulse signal included in the control signal, and generates and outputs a history print data signal that defines heat generating time periods of dots corresponding to print lines that are printed on the basis of the divided print data signals; and a conversion clock synchronizer that outputs the history print data signal in synchronization with a driving signal for the thermal head.

BRIEF DESCRIPTION OF DRAWINGS

FIG. 15 is a diagram illustrating a schema of logical arithmetic operations by a history data arithmetic module according to the embodiment.

FIG. 16 is a diagram illustrating another example of a logical expression of logical arithmetic operations by the history data arithmetic module according to the embodiment.

FIG. 19 is a diagram illustrating an example of a logical arithmetic expression for compression of divided history print data signals.

FIG. 24 is a diagram illustrating an example of signals corresponding to one line input to the interface circuit and a thermal head.

FIG. 27 is a diagram for comparison of elements between the thermal printer according to the embodiment and a thermal printer according to a comparative example.

DESCRIPTION OF EMBODIMENTS

Embodiments of an interface circuit and a thermal history control method disclosed by the present application will be described in detail below while reference is made to the appended drawings. A thermal printer having, installed therein, the interface circuit that executes the thermal history control method disclosed by the present application will be described with respect to the following embodiments.

Introduction

Thermal printers with a line thermal head are used as printing devices, such as receipt issuing printers installed in point of sales (POS) devices, for example. On the basis of a print data signal and a print command transmitted from a host, such as a POS device, for example, a thermal printer drives plural heat generating elements allocated to respective dots corresponding to the print data signal to be printed, and performs printing on a print medium, such as recording paper, using heat generated by the heat generating elements.

Figure 1:
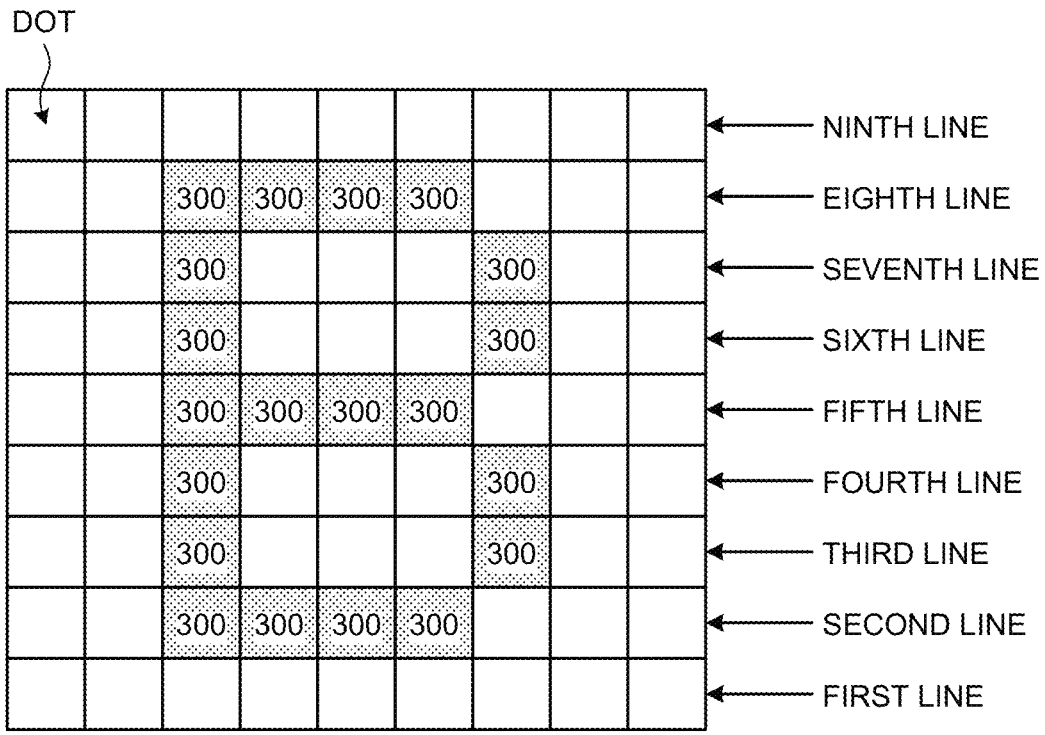
FIG. 1 is a diagram illustrating an example of printing without thermal history control.
Figure 2:
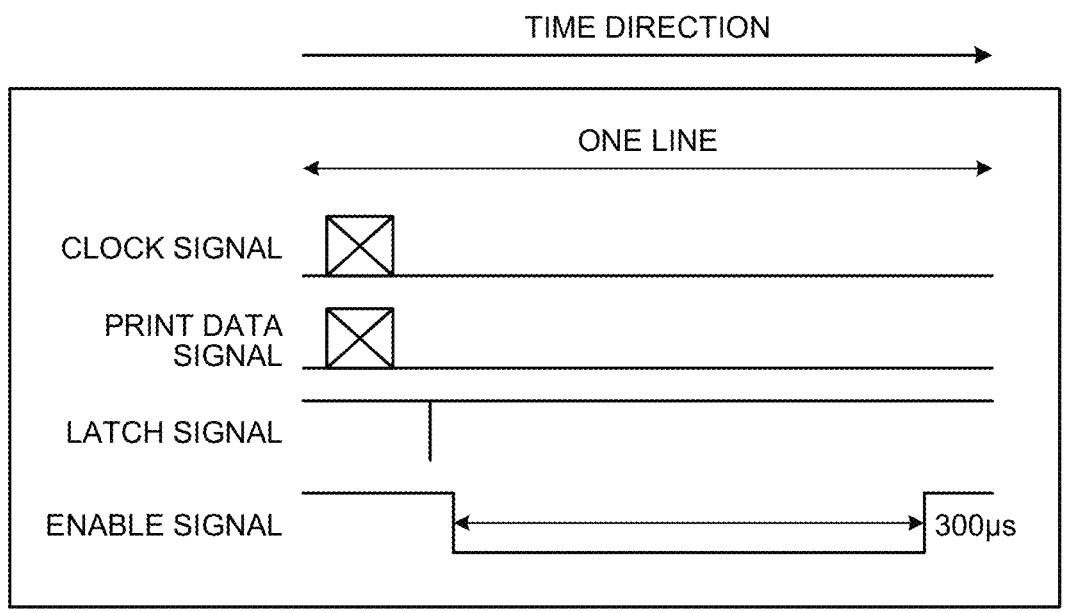
FIG. 2 is a diagram illustrating an example of a print data signal without thermal history control.
Figures 3, 4:
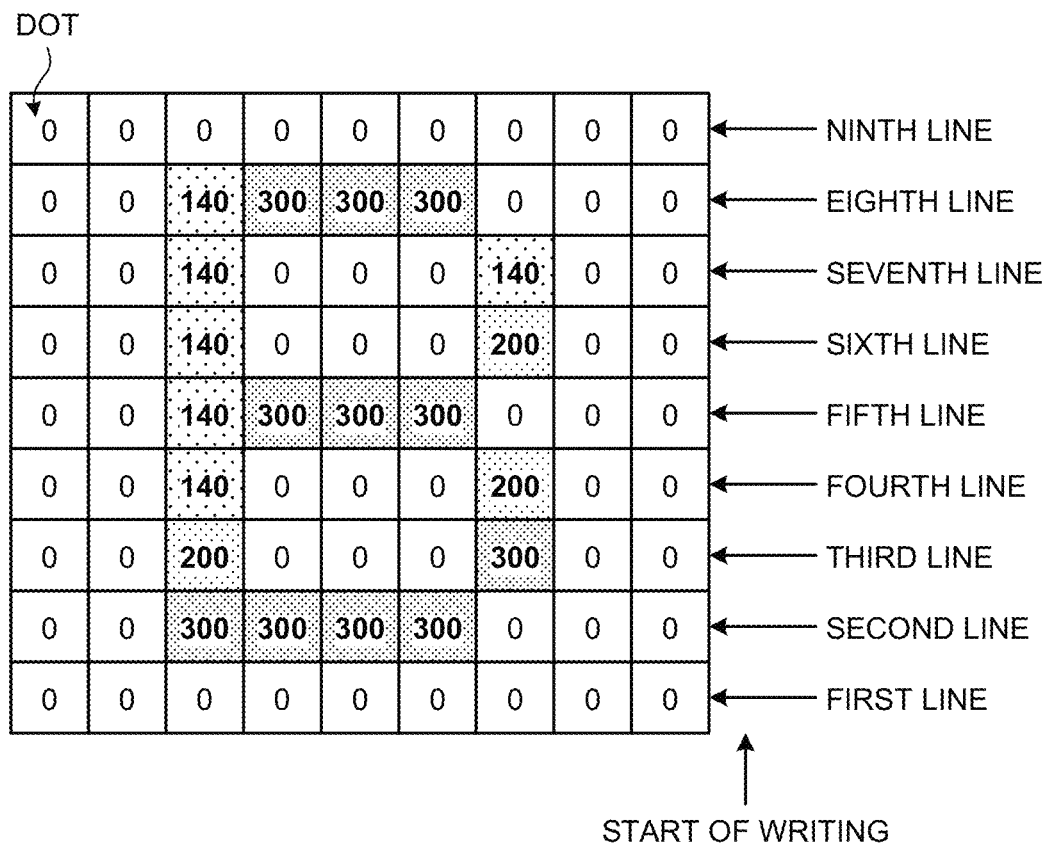
FIG. 3 is a diagram illustrating an example of printing by thermal history control.
FIG. 4 is a diagram illustrating an example of a print data signal for thermal history control.
Figure 5:
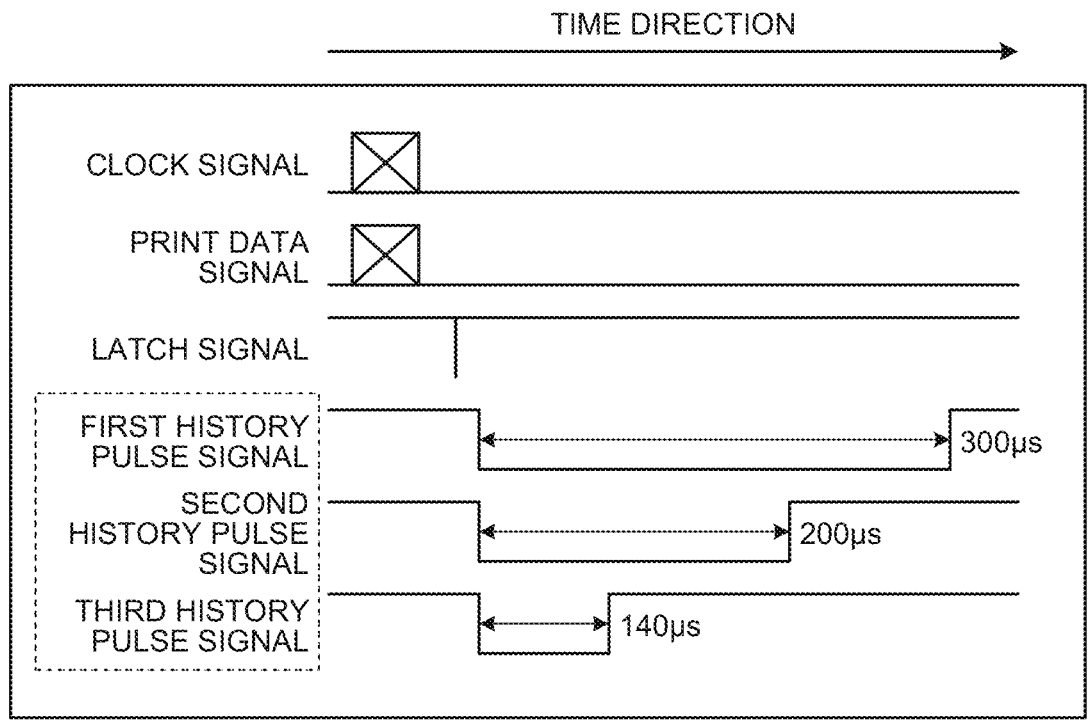
FIG. 5 is a diagram illustrating an example of a print data signal for thermal history control by a driver IC.

In such a thermal printer, thermal history control for reducing influence of heat accumulation due to past print operation is performed for dots corresponding to a print data signal to be printed. FIG. 1 is a diagram illustrating an example of printing without thermal history control. FIG. 2 is a diagram illustrating an example of a print data signal without thermal history control. FIG. 3 is a diagram illustrating an example of printing by thermal history control. FIG. 4 is a diagram illustrating an example of a print data signal for thermal history control. FIG. 5 is a diagram illustrating an example of a print data signal for thermal history control by a driver IC. Numbers in dots illustrated in FIG. 1 and FIG. 3 indicate time periods (ON time periods) during which energy is applied to the dots.

In the example of the printing without thermal history control illustrated in FIG. 1, a single amount of energy determined by a width of an enable signal (for example, an ON time period: 300 μs (microseconds)) is applied to each dot on the basis of the print data signal illustrated in FIG. 2. Therefore, the printing without thermal history control is influenced by heat accumulation (thermal histories) of the dots, the heat accumulation resulting from past print operation.

In contrast, in the example of the printing by thermal history control illustrated in FIG. 3, frequent transmission of the print data signal (data for thermal history control) as illustrated in FIG. 4 forcibly causes repetition of ON/OFF switching, and energy applied to each dot corresponding to the print data signal to be printed is thereby individually adjusted. As a result, this printing by thermal history control is less affected by thermal histories.

For example, if a driver IC installed in a thermal head performs thermal history control, as illustrated in FIG. 5, thermal history control data (history pulse signals) for controlling time periods during which energy is applied to the respective dots are automatically allocated by the driver IC and this is convenient as there is no need to prepare the thermal history control data. However, adding a function to the driver IC has a problem that not only the unit price of the head is increased but also the circuit size of the driver IC is increased.

In a case where thermal history control is performed outside a thermal head, a print data signal needs to be converted to thermal history control data, and the thermal history control data need to be transmitted at appropriate times to be in synchronization with driving of the thermal head. When the thermal history control is performed outside, a memory for storing the thermal history control data is needed and the circuit size is thus increased correspondingly to the number of print lines (the number of history stages) referred to for the thermal history control.

In view of the above, in the present application, an interface circuit described below is installed in a thermal printer that performs thermal history control outside a thermal head. This aims to improve each of the cost required for the thermal history control, and the printing speed and printing quality in the thermal history control.

Example of Configuration of Thermal Printer

Figure 6:
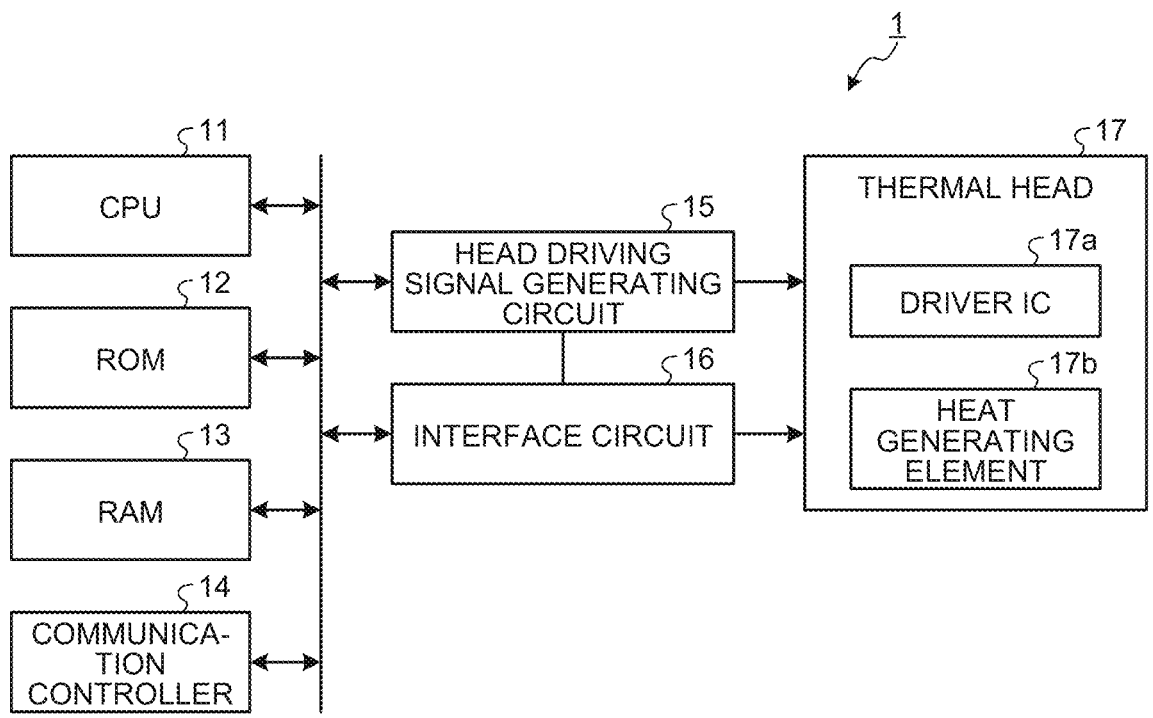
FIG. 6 is a diagram illustrating an example of a configuration of a thermal printer according to an embodiment.

FIG. 6 is a diagram illustrating an example of a configuration of a thermal printer according to an embodiment. As illustrated in FIG. 6, a thermal printer 1 includes a CPU 11, a ROM 12, a RAM 13, a communication controller 14, a head driving signal generating circuit 15, an interface circuit 16, and a thermal head 17.

The central processing unit (CPU) 11 executes control of each module of the thermal printer 1 and various types of processing, on the basis of programs and applications stored in the read only memory (ROM) 12. By the CPU 11 reading, for example, a program stored in the ROM 12 and executing the program read, with the random access memory (RAM) 13 serving as a work area, the control of each module of the thermal printer 1 and the various types of processing are implemented. The CPU 11 functions as a system controller that controls the overall system of the thermal printer 1.

The ROM 12 stores the programs for controlling each module of the thermal printer 1 and the applications for executing the various types of processing of the thermal printer 1.

The RAM 13 is used as a memory area needed for the CPU 11 to execute arithmetic operations, for example.

The communication controller 14 receives, for example, print commands and print data signals from an external device, such as a host, not illustrated in the drawings.

Figure 7:
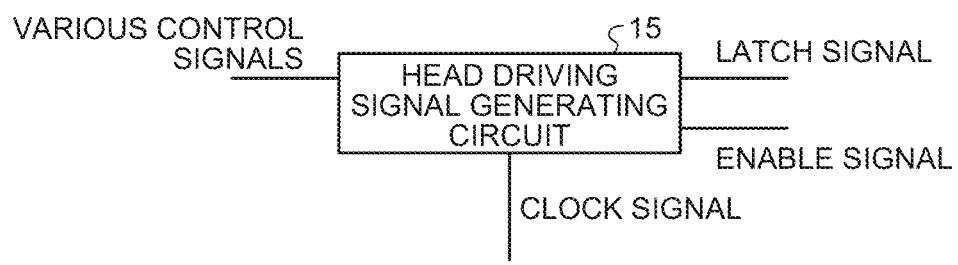
FIG. 7 is a diagram illustrating an example of signals output from a head driving signal generating circuit according to the embodiment.

The head driving signal generating circuit 15 outputs various signals on the basis of signals input from the interface circuit 16. FIG. 7 is a diagram illustrating an example of signals output from the head driving signal generating circuit 15 according to the embodiment.

As illustrated in FIG. 7, the head driving signal generating circuit 15 outputs a latch signal, an enable signal, and a clock signal, according to control signals input from the interface circuit 16 and set values. The latch signal and clock signal are signals for determining a print pattern. The enable signal is a signal that determines a print density. The latch signal, enable signal, and clock signal function as signals that control driving of the thermal head 17. The clock signal is generated by, for example, frequency division of a system clock signal serving as a reference for the overall operation of the thermal printer 1. When the head driving signal generating circuit 15 completes outputting the various signals, the head driving signal generating circuit 15 outputs an output completion signal. The output completion signal is input to the interface circuit 16. When brought into an auto-clear state, the head driving signal generating circuit 15 automatically outputs the various signals in order.

The interface circuit 16 is installed upstream of the thermal head 17, and is connected to: the CPU 11 that controls the overall system of the thermal printer 1; and a driver IC 17a that controls driving of a heat generating element 17b installed in the thermal head 17. The interface circuit 16 transfers a print data signal and a control signal output from the CPU 11, to the driver IC 17a. Thermal history control data are thereby able to be generated readily outside the thermal head 17 by using existing signals for driving the thermal head 17, while minimizing increase in the circuit size.

The thermal head 17 includes the driver IC 17a and the heat generating element 17b. On the basis of the latch signal and enable signal output from the head driving signal generating circuit 15, the driver IC 17a drives the heat generating element 17b and executes print operation corresponding to the print data signal output from the interface circuit 16.

Example of Configuration of Interface Circuit

Figure 8:
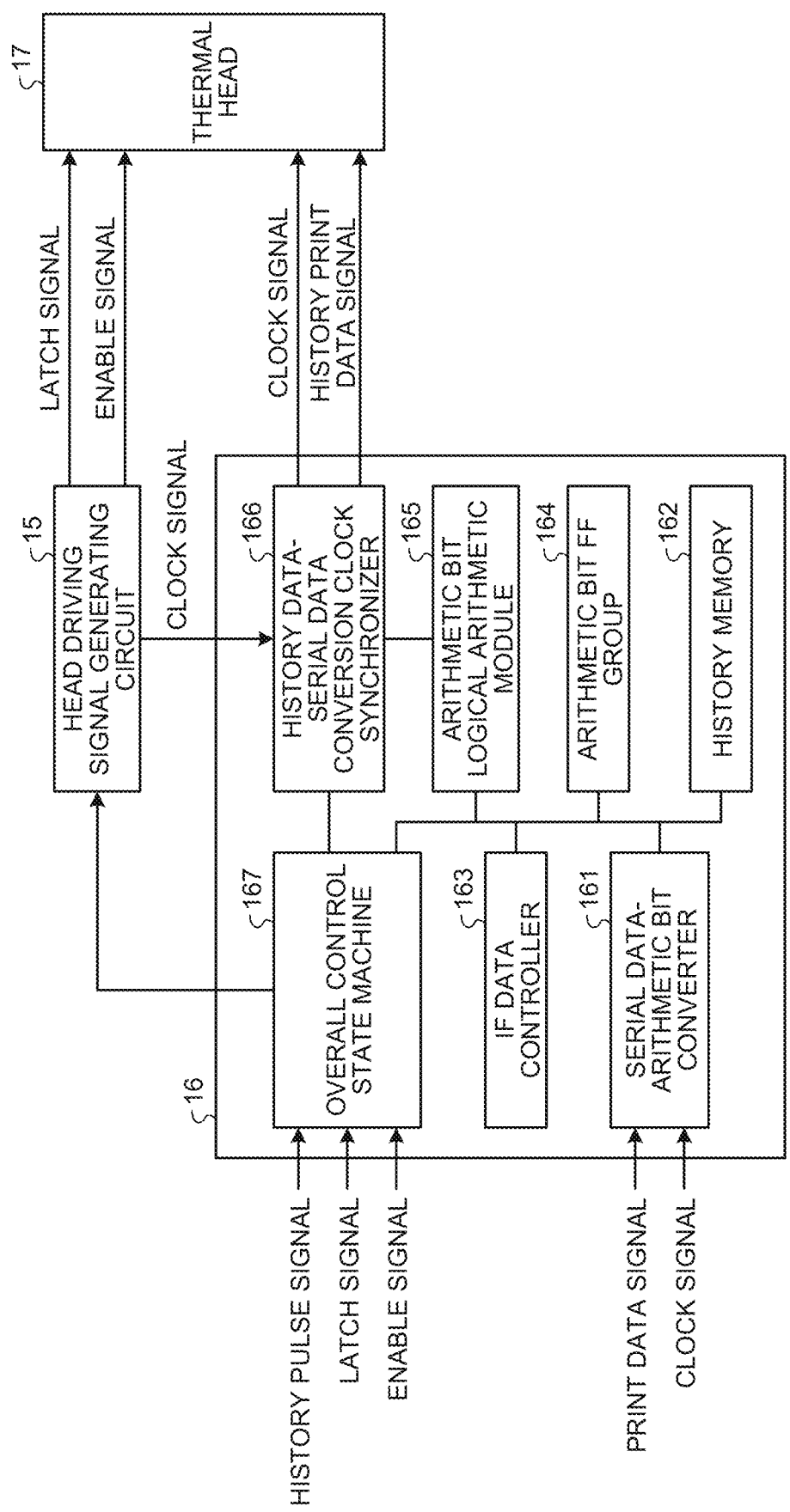
FIG. 8 is a diagram illustrating an example of a configuration of an interface circuit according to the embodiment.

FIG. 8 is a diagram illustrating an example of a configuration of the interface circuit according to the embodiment. The interface circuit 16 is implemented by an integrated circuit, such as an application specific integrated circuit (ASIC) or a field programmable gate array (FPGA). The interface circuit 16 may be implemented by a circuit other than an ASIC or an FPGA, as long as the interface circuit 16 is a circuit having arithmetic functions.

As illustrated in FIG. 8, the interface circuit 16 includes a serial data-arithmetic bit converter 161, a history memory 162, an IF data controller 163, an arithmetic bit FF group 164, an arithmetic bit logical arithmetic module 165, a history data-serial data conversion clock synchronizer 166, and an overall control state machine 167.

Each block included in the interface circuit 16 is a functional block representing a function that the interface circuit 16 has. These functional blocks are, for example, hardware blocks, and each of these functional blocks may be a circuit block on a semiconductor chip (die). Each of the functional blocks may be a processor or an integrated circuit, of course.

Figure 9:
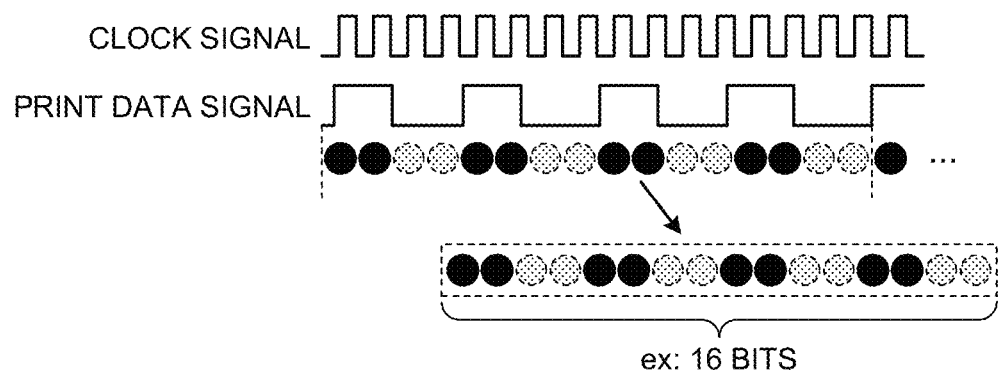
FIG. 9 is a diagram illustrating a schema of operation of a serial data-arithmetic bit converter according to the embodiment.

The serial data-arithmetic bit converter 161 functions as a converter that obtains a print data signal and a clock signal that is included in a control signal, and outputs the print data signal divided into pieces each having a predetermined bit width. FIG. 9 is a diagram illustrating a schema of operation of a serial data-arithmetic bit converter according to the embodiment.

When the serial data-arithmetic bit converter 161 detects input of a clock signal (a clock signal input from the CPU) and a print data signal, the serial data-arithmetic bit converter 161 notifies the overall control state machine 167, of that detection by turning each detection signal "ON". Specifically, when a clock signal is input to the serial data-arithmetic bit converter 161, a detection signal for the clock signal is turned "ON" for a specified time period. In response to this, the serial data-arithmetic bit converter 161 notifies the overall control state machine 167 of the input of the clock signal. When a print data signal corresponding to a specified number of bits is input to the serial data-arithmetic bit converter 161, a detection signal for the print data signal is turned "ON". In response to this, the serial data-arithmetic bit converter 161 notifies the overall control state machine 167, of the input of the print data signal.

The serial data-arithmetic bit converter 161 outputs the print data signal divided into pieces each having a predetermined bit width (for example, 16 bits) that has been set beforehand for arithmetic operations, as illustrated in FIG. 9, until input of all of the print data signal is completed. When the serial data-arithmetic bit converter 161 has stored all of the divided pieces (hereinafter, referred to as "divided print data signals" as appropriate) of the print data signal, each of the divided pieces having the predetermined bit width, into the history memory 162, the detection signal for the print data signal is turned "OFF". The detection signal for the clock signal and the detection signal for the print data signal are synchronized with each other by a system clock. By dividing the print data signal into predetermined bit widths, generation and output of a divided print data signal (an example of a second divided print data signal) by the serial data-arithmetic bit converter 161 is able to be performed in parallel with generation and output of a divided history print data signal (a first divided history print data signal) by the arithmetic bit logical arithmetic module 165 (a history data arithmetic module 165a) described later.

Figure 10:
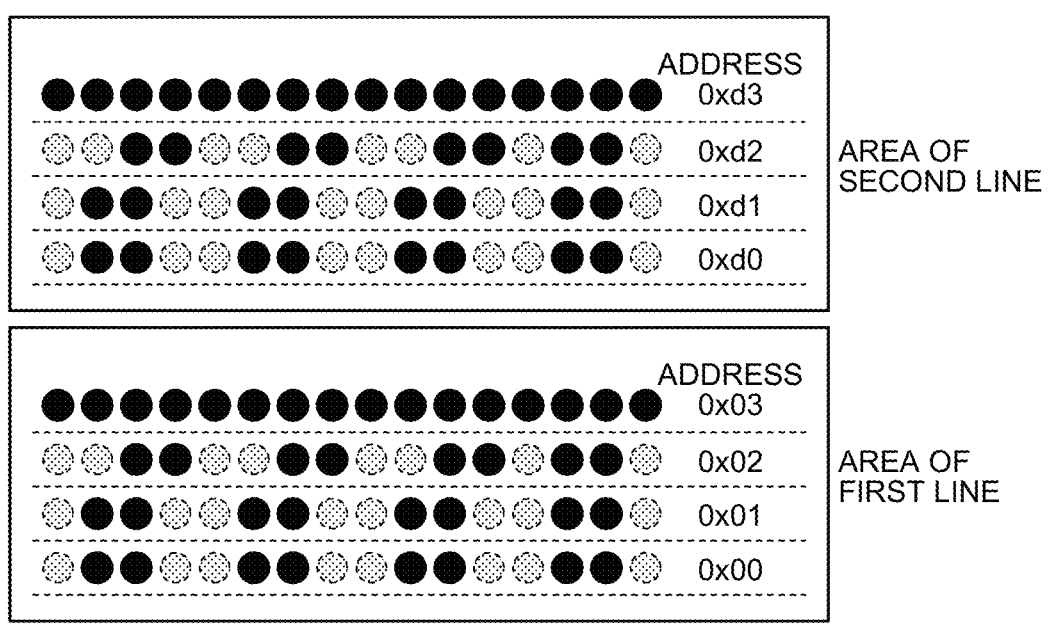
FIG. 10 is a diagram illustrating a schema of data stored in a history memory according to the embodiment.

The history memory 162 functions as a storage that stores pieces of a print data signal (divided print data signals) divided by the serial data-arithmetic bit converter 161, each of the pieces having the predetermined bit width. FIG. 10 is a diagram illustrating a schema of a print data signal stored in a history memory according to the embodiment.

As illustrated in FIG. 10, divided print data signals output from the serial data-arithmetic bit converter 161 are stored at respective addresses of the history memory 162. In the example illustrated in FIG. 10, a print data signal of a first line is divided into four pieces that are divided print data signals each having 16 bits and these four divided print data signals are respectively stored at addresses 0x00 to 0x03.

At the time of write operation in the interface circuit 16, writing in an address area of a corresponding line in the history memory 162 is performed. At the time of read operation in the interface circuit 16, each divided print data signal stored in an address area of a corresponding line in the history memory 162 is output.

The history memory 162 is implemented by a part of an additional memory, such as an SRAM, a part of a memory area provided in the interface circuit 16, or a flip-flop (FF) circuit provided in the interface circuit 16, for example.

The history memory 162 is able to stores compression information (a compressed history print data signal) resulting from compression of a past history print data signal corresponding to plural print lines.

Figure 11:
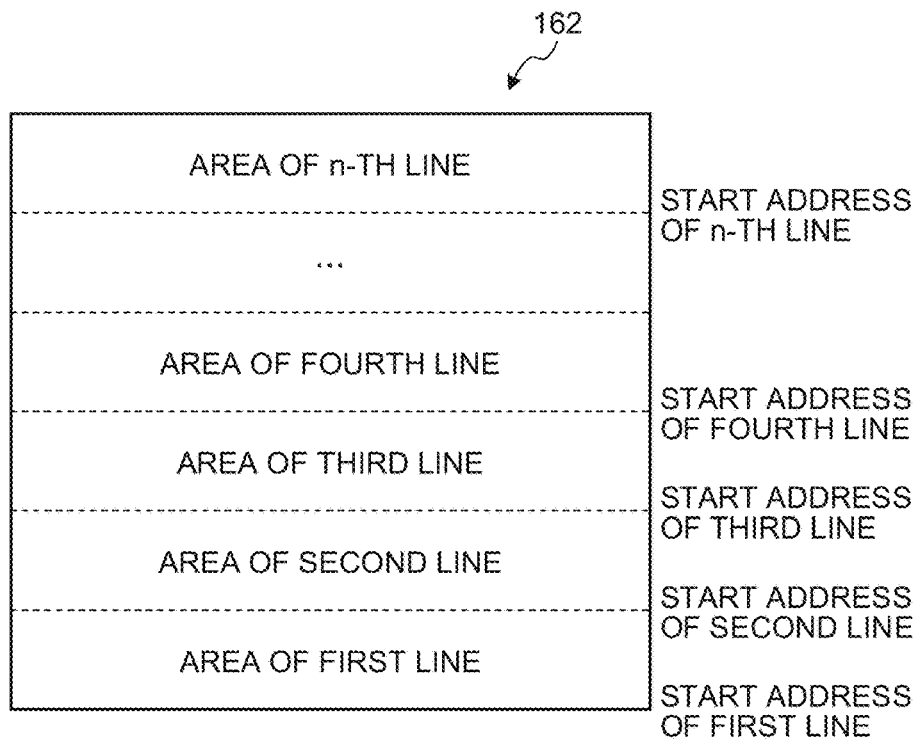
FIG. 11 is a diagram illustrating a schema of operation by an IF data controller according to the embodiment.

The IF data controller 163 functions as a data controller that controls the order of each of: writing of a print data signal into the history memory 162; and reading of a history print data signal from the history memory 162. FIG. 11 is a diagram illustrating a schema of operation by an IF data controller according to the embodiment.

As illustrated in FIG. 11, the IF data controller 163 controls a data storage area of the history memory 162 by dividing the data storage area into plural lines. The configuration of the data storage area in the history memory 162 may be modified as appropriate according to the circuit size and the number of history stages. The number of history stages presets to which line past print data signals (thermal histories) stored in the history memory 162 are to be referred back to in performing thermal history control. For example, if print data signals up to and including the second past line are to be referred to, the number of history stages is three.

Write Operation

For write operation, the IF data controller 163 performs writing by repeating the following operations (A) to (C).

(A) Outputting an address and an enable signal to the history memory 162, the address and enable signal being for writing in an area corresponding to the current line, with a start address of an address area specified per line being the starting point (B) Outputting an address and an enable signal while incrementing the address per data line when there are plural input data lines (C) Being brought into a standby state and maintaining the current address, if data to be written (a divided print data signal) have not arrived When the IF data controller 163 controls writing in the history memory 162 by repeating each of the above mentioned operations (A) to (C) and performs writing corresponding to the number of bits that have been specified beforehand, the IF data controller 163 outputs an end signal.

Read Operation

For read operation, the IF data controller 163 performs the following operations (W) to (Z).

(W) In response to input of an arithmetic operation start signal, simultaneously performing: outputting an address of a divided print data signal corresponding to the current line; and outputting an enable signal for an FF of the current line of the arithmetic bit FF group 164 and storing the divided print data signal (X) Outputting an enable signal of the arithmetic bit FF group 164 corresponding to an address corresponding to a line immediately preceding the current line and repeating similarly for the number of lines (Y) When divided print data signals corresponding to the number of lines needed have been stored, outputting a data notification signal and an enable signal, to the history data-serial data conversion clock synchronizer 166

(Z) When there are plural input and output data lines, incrementing the address to the corresponding data line number, and repeating the above mentioned operations (X) to (Z)

When the above mentioned operations (W) to (Z) are completed, the IF data controller 163 outputs an arithmetic bit output completion signal, waits for input of the next arithmetic operation start signal, and in response to input of the next arithmetic operation start signal, returns to the above operation (W).

When output corresponding to a specified number of bits is completed, the IF data controller 163 outputs an end signal, to the overall control state machine 167.

Figure 12:
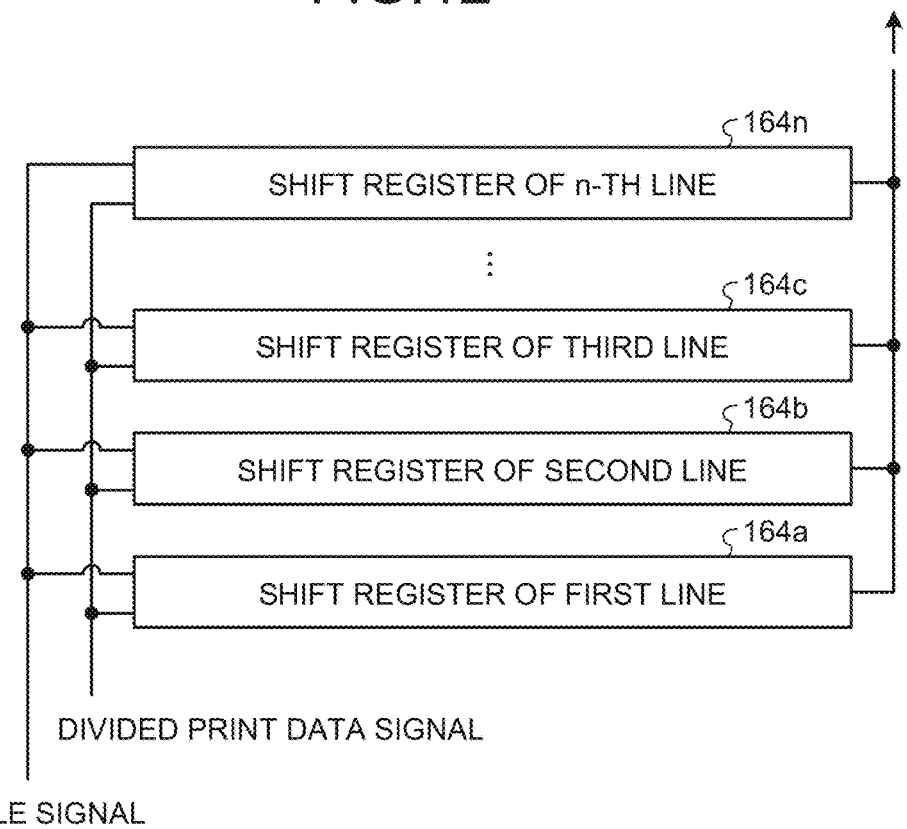
FIG. 12 is a diagram illustrating a schema of operation of an arithmetic bit FF group according to the embodiment.

For the arithmetic bit logical arithmetic module 165 to generate a history print data signal, the arithmetic bit FF group 164 temporarily stores divided print data signals read out from the history memory 162. FIG. 12 is a diagram illustrating a schema of operation of an arithmetic bit FF group according to the embodiment.

As illustrated in FIG. 12, the arithmetic bit FF group 164 has plural shift registers 164a to 164n provided for lines respectively. When an enable signal is "ON", the arithmetic bit FF group 164 reads input of a divided print data signal and stores the input into a corresponding shift register. When the divided print data signals stored respectively in the shift registers 164a to 164n are merged, the resultant signal corresponds to the print data signal corresponding to one line of each print line. Data output from the shift registers 164a to 164n are input to the arithmetic bit logical arithmetic module 165. In a case where compression information (a compressed history print data signal) stored in the history memory 162 is referred to when the later described arithmetic bit logical arithmetic module 165 generates divided history print data signals, the arithmetic bit FF group 164 includes a shift register that stores the compression information.

Figure 13:
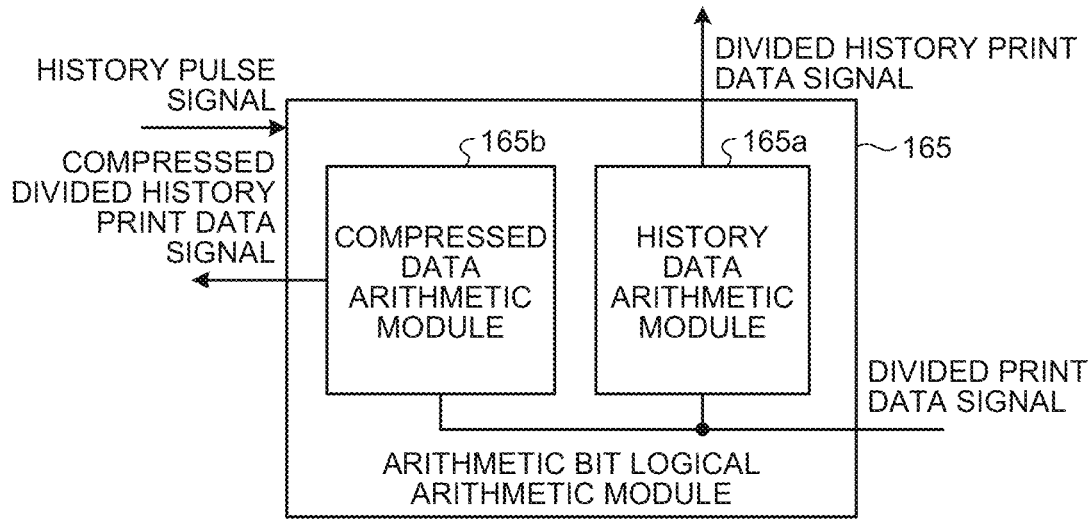
FIG. 13 is a diagram illustrating an example of a configuration of an arithmetic bit logical arithmetic module according to the embodiment.
Figure 14:
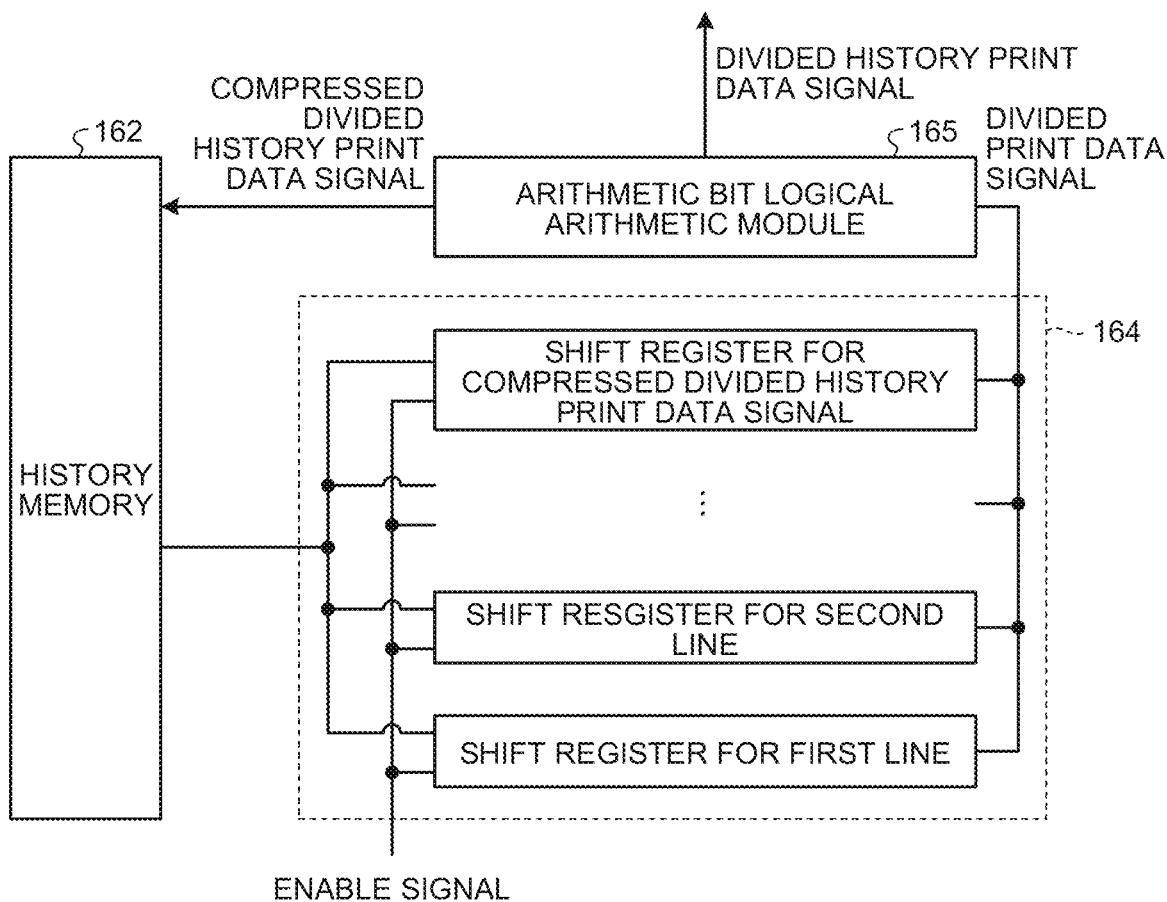
FIG. 14 is a diagram for explanation of a schema of operation of the arithmetic bit logical arithmetic module according to the embodiment.

The arithmetic bit logical arithmetic module 165 functions as a logical arithmetic module that: performs logical arithmetic operations based on divided print data signals divided such that each divided print data signal has a predetermined bit width, and a history pulse signal included in a control signal; and generates and outputs divided history print data signals defining heat generating time periods for dots corresponding to print lines to be printed on the basis of a print data signal. FIG. 13 is a diagram illustrating an example of a configuration of an arithmetic bit logical arithmetic module according to the embodiment. FIG. 14 is a diagram for explanation of a schema of operation of the arithmetic bit logical arithmetic module according to the embodiment.

As illustrated in FIG. 13, the arithmetic bit logical arithmetic module 165 has the history data arithmetic module 165a and a compressed data arithmetic module 165b. The history data arithmetic module 165a generates divided history print data signals and outputs the divided history print data signals to the history data-serial data conversion clock synchronizer 166. The compressed data arithmetic module 165b generates a compressed history print data signal (an example of information that functions as history data) that is compression information (information indicating a history of printing) resulting from compression of a past history print data signal corresponding to plural print lines, and stores the compressed history print data signal into the history memory 162. As illustrated in FIG. 14, the arithmetic bit logical arithmetic module 165 executes the generation and output of the divided history print data signals by the history data arithmetic module 165a, concurrently and in parallel with the generation and output of the compressed history print data signal by the compressed data arithmetic module 165b.

Thermal history control is performed by allocating a pulse width corresponding to each dot on the basis of past print data signals and surrounding print data signals intended to be printed. The pulse width defines a heat generating time period of the dot and is defined by a history pulse signal. If the number of surrounding print data signals used is "n−1", "$2^n$" types of pulse widths are needed. In view of the data transmission time period and the quality of printing, similar pulse widths are considered as the same pulse widths for simplification of the logical arithmetic operations. Allocation of pulse widths in thermal history control will be described while reference is made to the drawings. Two-stage history control for two history stages will be described below. FIG. 15 is a diagram illustrating a schema of logical arithmetic operations by a history data arithmetic module according to the embodiment.

In FIG. 15, a gray (shaded) circle represents a non-heat-generating dot d1 and a black circle represents a heat generating dot d2. A line Q1 represents a dot image of a print line to be printed next and a line Q2 represents a dot image of a print line that has been printed immediately before the line Q1. The line Q1 represents a print line that is printed on a medium, such as recording paper, by heat generating elements being driven to not generate heat, generate heat, not generate heat, and generate heat, respectively. The line Q2 represents a print line to be printed next by the heat generating elements being driven to not generate heat, not generate heat, generate heat, and generate heat, respectively. For two-stage history control, the number of surrounding print data signals is, for example "1" (n=2) in a column direction, and four types of pulse widths are thus needed. Therefore, according to a logical expression $LF_1$ illustrated in FIG. 15, the arithmetic bit logical arithmetic module 165 generates divided history print data signals by allocating history pulse signals CONT1 to CONT4, according to states 1 to 4 each indicated by a combination of a heat generating state of the current dot (to perform printing next) and a heat generating state of a corresponding dot in an immediately preceding print operation, the history pulse signals CONT1 to CONT4 respectively determining the four types of pulse widths. For example, if the heat generating state of a dot in an immediately preceding print operation is non-heat-generating (gray circle) and the heat generating state of a dot in the current print operation is heat generating (black circle), according to the logical expression illustrated in FIG. 15, the signal CONT3 is allocated to the dot in the current print operation.

The two-stage history control requires four types of pulse widths but for practical use, the number of types of the pulse widths may be reduced to two or three. For example, for the logical arithmetic operations illustrated in FIG. 15, the pulse width of the history pulse signal CONT2 is "0" and the history pulse signal CONT2 is thus able to be deleted. For specifications without preheating of dots, the history pulse signal CONT1 is able to be deleted. FIG. 15 illustrates the two-stage history control as an example for convenience of explanation, but the actual number of history stages may be changed according to the specifications.

FIG. 16 is a diagram illustrating another example of a logical expression of logical arithmetic operations by the history data arithmetic module according to the embodiment. A logical expression $LF_2$ illustrated in FIG. 16 corresponds to logical arithmetic operations for executing thermal history control based on divided history print data signals up to and including the second past line and compressed divided history print data signals for lines after and including the third past line, for example. Symbols CONT1 to CONT8 illustrated in FIG. 16 represent history pulse signals. Symbols Q1 to Q3 illustrated in FIG. 16 respectively represent a print line Q1 to be printed next, a print line Q2 that has been printed immediately before the print line Q1, and a print line Q3 that has been printed immediately before the print line Q2. A symbol BQ1 illustrated in FIG. 16 represents an immediately preceding compressed divided history print data signal BQ1 and a symbol BQ2 illustrated in FIG. 16 represents a compressed divided history print data signal BQ2 immediately preceding the compressed divided history print data signal BQ1. A symbol HQ illustrated in FIG. 16 represents divided history print data signals output from the history data arithmetic module 165a. According to the logical expression $LF_2$ illustrated in FIG. 16, for example, as illustrated uppermost in the logical expression $LF_2$, in generating a divided history print data signal, if Q1 is heat generating, Q2 is non-heat-generating, Q3 is non-heat-generating, and any one of BQ1 and BQ2 is non-heat-generating, the signal CONT1 is allocated as the history pulse signal.

As described above, by performing logical arithmetic operation based on divided print data signals for several lines and a history pulse signal, the history data arithmetic module 165a generates and outputs a history print data signal for printing by thermal history control.

Figure 17:
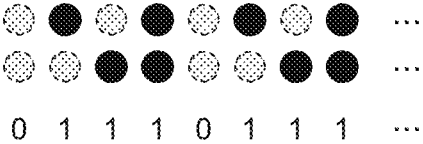
FIG. 17 is a dot image diagram illustrating an example (No. 1) of compression of divided history print data signals.
Figure 18:
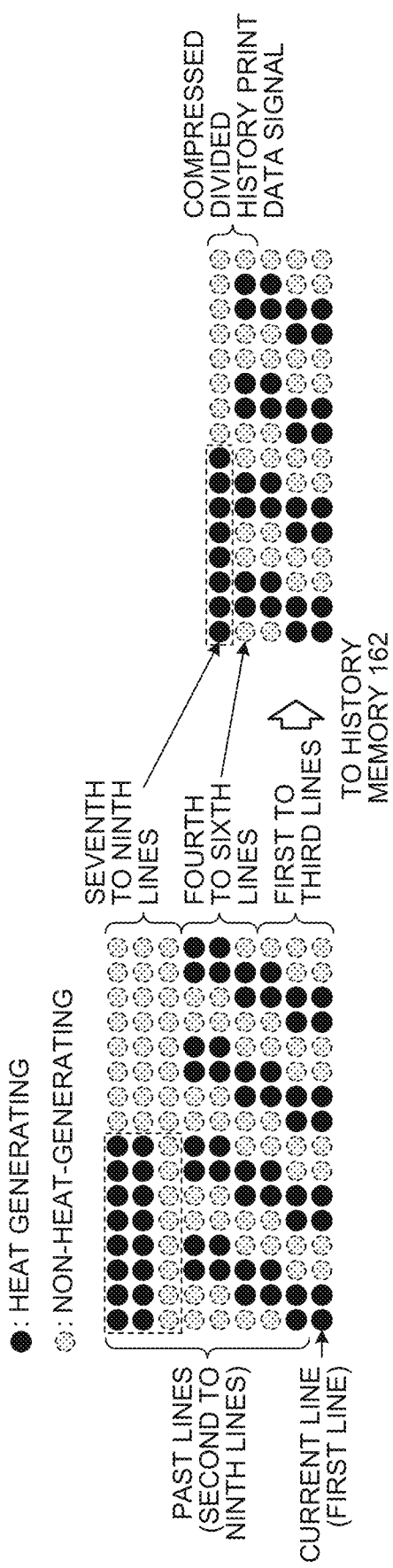
FIG. 18 is a dot image diagram illustrating an example (No. 2) of compression of divided history print data signals.
Figure 19:
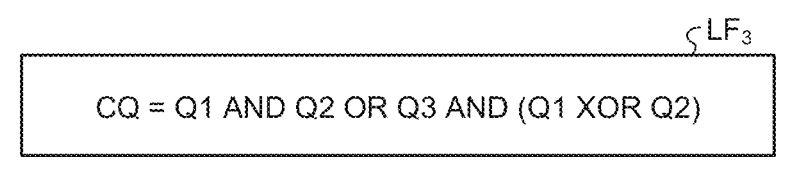

The compressed data arithmetic module 165b generates a compressed divided history print data signal that is compression information resulting from compression of past divided history print data signals corresponding to plural print lines, and stores the compressed divided history print data signal into the history memory 162. FIG. 17 is a dot image diagram illustrating an example (No. 1) of compression of divided history print data signals. FIG. 18 is a dot image diagram illustrating another example (No. 2) of compression of divided history print data signals. FIG. 19 is a diagram illustrating an example of a logical arithmetic expression for compression of divided history print data signals.

For two-stage history control, the compressed data arithmetic module 165b performs compression of divided history print data signals by performing logical arithmetic operations per two lines of: a divided history print data signal of a print line to be printed next; and a divided history print data signal of a print line that has been printed immediately before that print line to be printed next. For example, as illustrated in FIG. 17, the compressed data arithmetic module 165b compresses divided history data signals to generate a compressed divided history print data signal by performing logical arithmetic operations so as to output "1" when at least one of a heat generating state and a planned heat generating state is heat generating and to output "0" for other cases, the heat generating state being that of a print line (a preceding line) printed by an immediately preceding print operation, the planned heat generating state being that of a print line (the current line) to be printed next. The compressed data arithmetic module 165b then stores the compressed divided history print data signal that is a result of the logical arithmetic operations, into the history memory 162. As a result, for example, divided history print data signals corresponding to two lines that are a print line to be printed next and a print line that has been printed immediately before that print line to be printed next are able to be collectively stored.

The compressed data arithmetic module 165b may store, as history data, as is, divided history print data signals corresponding to a predetermined number of print lines (a predetermined number of past print lines) from and including an immediately preceding line printed immediately before a print line to be printed next, without compressing the divided history print data signals, into the history memory 162, or generate compressed history data and store the compressed history data into the history memory 162 for divided history print data signals corresponding to past print lines (past print lines that are older than the predetermined number of print lines) other than the predetermined number of print lines from and including the immediately preceding line. The history data arithmetic module 165a is thereby able to generate divided history print data signals for thermal history control based on the divided history print data signal for the print line to be printed next, the divided history print data signals (history data) corresponding to the predetermined number of print lines from and including the immediately preceding line, and the compressed divided history print data signal (history data) for the past lines from the third past line. Specifically, as illustrated in FIG. 18, the compressed data arithmetic module 165b stores history data indicating a history of printing in the past, as is, into the history memory 162, for example, for divided history print data signals up to and including a second past line, counting a divided history print data signal of a print line to be printed next (the current line) as the first line, that is, for divided history print data signals from the first line to the third line illustrated in FIG. 18. This is done in consideration of the fact that thermal histories corresponding to recent history print data signals largely influence printing by thermal history control.

On the contrary, the compressed data arithmetic module 165b performs compression per three lines, according to a logical expression $LF_3$ illustrated in FIG. 19 for divided history print data signals from the third past line, that is, from the fourth line in FIG. 18. This is done in consideration of the fact that thermal histories corresponding to past history print data signals have a comparatively small influence on printing by thermal history control. A symbol CQ illustrated in FIG. 19 represents a compressed divided history print data signal (history data) output from the compressed data arithmetic module 165b. Symbols BQ1 and BQ2 illustrated in FIG. 19 correspond to BQ1 and BQ2 illustrated in FIG. 16, the symbol BQ1 representing an immediately preceding compressed divided history print data signal, the symbol BQ2 representing a compressed divided history print data signal BQ2 immediately before the compressed divided history print data signal BQ1. That is, in the case illustrated in FIG. 18, the compressed divided history print data signal resulting from compression of the divided history print data signals from the fourth line to the six line corresponds to BQ1 illustrated in FIG. 19, and the compressed divided history print data signal resulting from compression of the divided history print data signals from the seventh line to the ninth line corresponds to BQ2 illustrated in FIG. 19. The logical expression $LF_3$ illustrated in FIG. 19 defines logical arithmetic operations to output heat generating (for example, "1" corresponding to heat generating) when two or more lines of divided history print data signals corresponding to three lines to be compressed are heat generating, and to output non-heat-generating (for example, "0" corresponding to non-heat-generating) for other cases, for example. By performing logical arithmetic operations according to this logical expression $LF_3$, the compressed data arithmetic module 165b is able to compress divided history print data signals. As represented by a dotted lined rectangle in FIG. 18, when there has been printing five times in a row in printing performed in the past, it is expected that there has been large heat generation, and even if the divided history print data signals are compressed, information indicating that large heat generation is retained without being lost.

For example, if the divided history print data signals are not compressed in the example illustrated in FIG. 18, a memory having 16 bits×9 lines=144 bits will be needed. In contrast, as illustrated in FIG. 18, when the divided history print data signals are compressed, a memory having 16 bits×5 lines=80 bits will suffice. As described above, by management of compression information resulting from compression of past divided history print data signals having comparatively low importance in thermal history control, the memory size of the interface circuit 16 is able to be reduced significantly.

Figure 20:
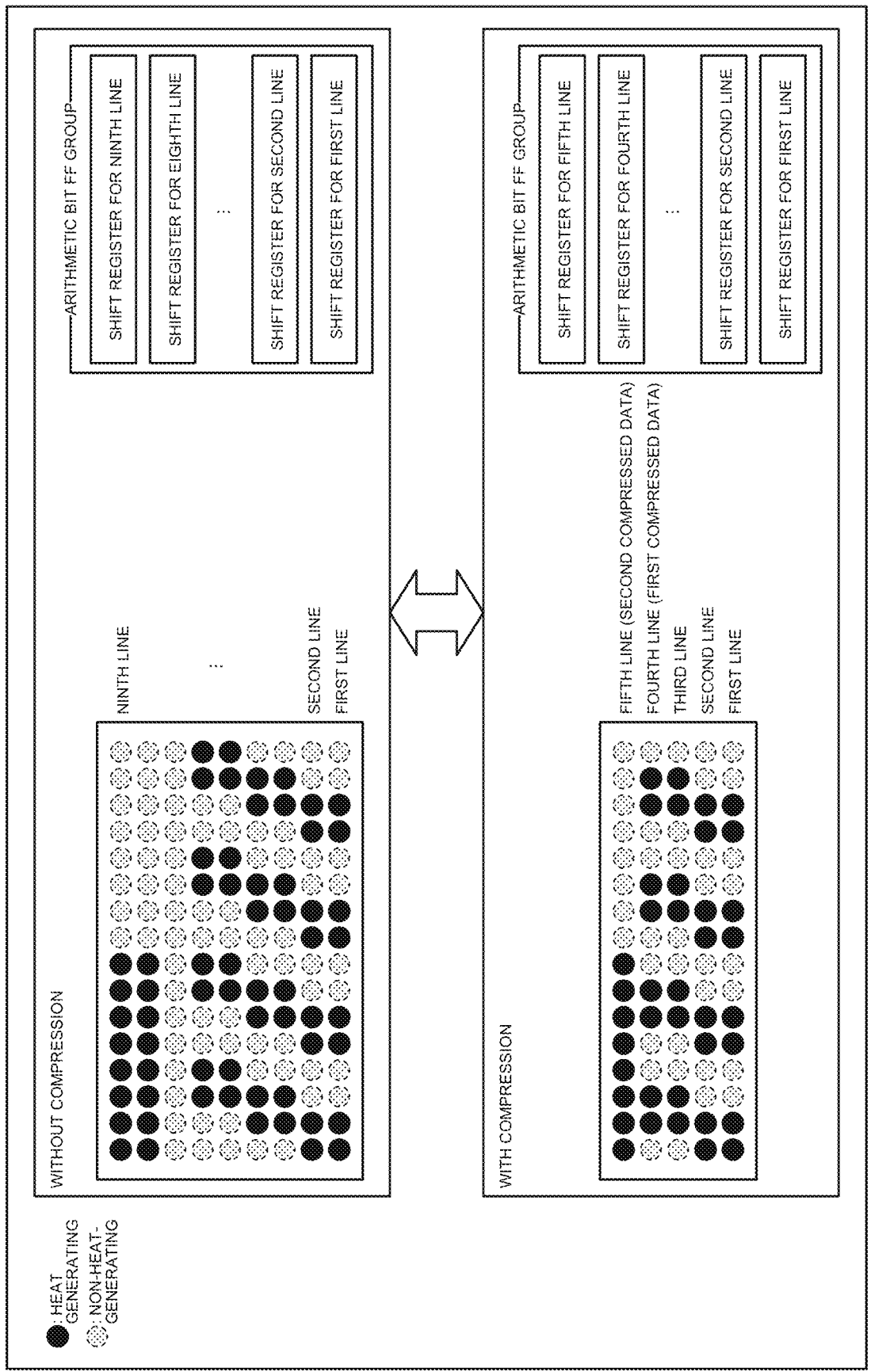
FIG. 20 is a diagram for comparison between signal storage for compression of divided history print data signals and signal storage without the compression.

The reduction in the memory size also contributes to improvement of the speed of arithmetic operations in the arithmetic bit logical arithmetic module 165. The improvement of the speed of arithmetic operations is associated with improvement of the printing speed. FIG. 20 is a diagram for comparison between signal storage for compression of divided history print data signals and signal storage without the compression. In FIG. 20, a compressed divided history print data signal generated in immediately preceding printing is referred to as first compressed data, and a compressed divided history print data signal generated in printing immediately preceding the immediately preceding printing is referred to as second compressed data, for the convenience of explanation.

As illustrated in the upper half of FIG. 20, when divided history print data signals are not compressed, a divided history print data signal of a first line is stored in a shift register for the first line in a first clock. Similarly, nine clocks are needed for divided history print data signals of a second line to a ninth line to be stored respectively in corresponding shift registers. In a tenth clock, the arithmetic bit logical arithmetic module 165 outputs the divided history print data signals and stores the divided history print data signals into the history memory 162. Therefore, in the example illustrated in FIG. 20, a total of ten clocks will be needed as the arithmetic operation time period.

In contrast, as illustrated in the lower half of FIG. 20, the interface circuit 16 according to the present application is able to compress the divided history print data signals to five lines by compressing the divided history print data signals, and five clocks will suffice for the divided history print data signals to be stored respectively into corresponding shift registers. In a sixth clock, the arithmetic bit logical arithmetic module 165 outputs the divided history print data signals and stores the divided history print data signals into the history memory 162, and the total arithmetic operation time period is thus able to be reduced to six clocks.

As described above, by compressing divided history print data signals, the interface circuit 16 (the arithmetic bit logical arithmetic module 165) in the present application is able to achieve an arithmetic operation speed that is about 1.6 times that in a case where the divided history print data signals are not compressed. As described above, the interface circuit 16 enables the memory size to be reduced and the arithmetic operation speed to be improved, in consideration of the influence of the thermal history.

Figure 21:
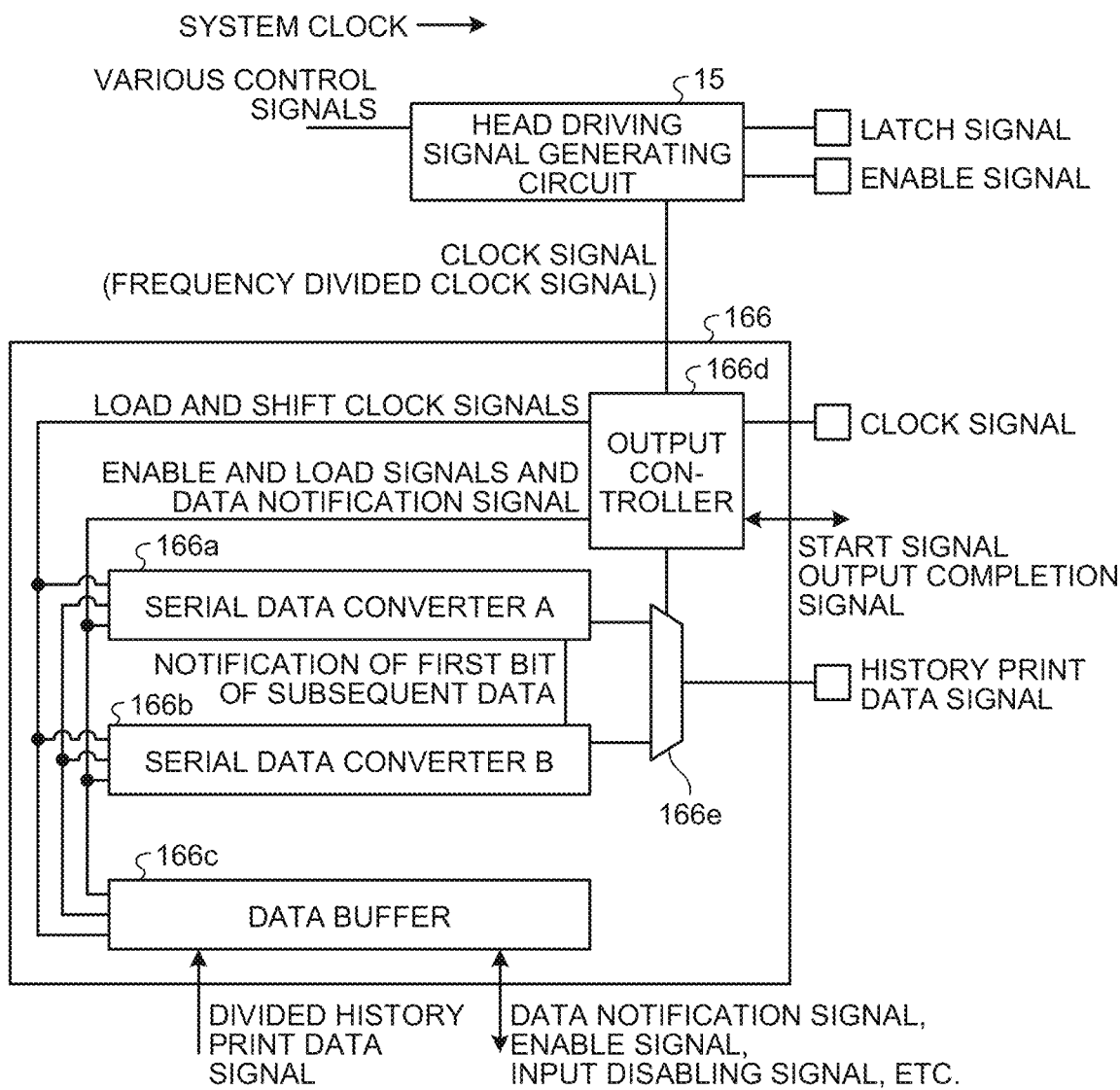
FIG. 21 is a diagram illustrating an example of a configuration of a history data-serial data conversion clock synchronizer according to the embodiment.

The history data-serial data conversion clock synchronizer 166 functions as a conversion clock synchronizer that outputs a history print data signal in synchronization with a driving signal for the thermal head 17. FIG. 21 is a diagram illustrating an example of a configuration of a history data-serial data conversion clock synchronizer according to the embodiment.

As illustrated in FIG. 21, the history data-serial data conversion clock synchronizer 166 has a serial data converter 166a, a serial data converter 166b, a data buffer 166c, an output controller 166d, and a multiplexer 166e, and implements the following operation through these modules.

The output controller 166d is brought into a synchronization standby state when a start signal is input from the overall control state machine 167.

When the output controller 166d receives, while the output controller 166d is in the synchronization standby state, input of the above mentioned data notification signal that notifies the output controller 166d of input of history data, from the IF data controller 163, the output controller 166d temporarily stores the history data output from the arithmetic bit logical arithmetic module 165, into the data buffer 166c. The output controller 166d then outputs an input disabling signal for the corresponding history data with respect to the data buffer 166c, to the overall control state machine 167.

When storage of all of the output history data signal into the data buffer 166c is completed, the output controller 166d stores the data in the data buffer 166c, into the serial data converter 166a, turns the input disabling signal off, and returns to the synchronization standby state.

When the output controller 166d receives input of the above mentioned data notification signal again, the output controller 166d temporarily stores history data into the data buffer 166c, and outputs an input disabling signal for the corresponding history data with respect to the data buffer 166c, to the overall control state machine 167.

When storage of all of the output history data signal into the data buffer 166c is completed, the output controller 166d stores the data in the data buffer 166c, into the serial data converter 166b, and turns the input disabling signal off.

The history data stored in the serial data converter 166a or the serial data converter 166b are converted into serial data.

By switching the multiplexer 166e as appropriate, the output controller 166d controls output of the serial data from the serial data converter 166a or serial data converter 166b, to the multiplexer 166e. The output controller 166d executes output of the serial data in the order of storage of the history data into the serial data converter 166a or serial data converter 166b.

The output controller 166d then outputs a history print data signal that is the serial data input to the multiplexer 166e, in synchronization with a driving signal for the thermal head 17, to the thermal head 17. The history print data signal to be output from the history data-serial data conversion clock synchronizer 166 to the thermal head 17 is output, as data for thermal history control synchronized with driving of the thermal head 17, to the thermal head 17.

If the data buffer 166c is empty, the output controller 166d requests the overall control state machine 167 and the IF data controller 163 to input history data, in parallel with output of serial data from the serial data converter 166a and serial data converter 166b.

If the data buffer 166c is not empty, the output controller 166d inputs history data stored in the data buffer 166c to the serial data converter 166a or serial data converter 166b when the serial data are no longer available.

The serial data converter 166a and the serial data converter 166b execute input of history data and output of serial data by alternately swapping their roles. Clock signals and print data signals are thereby able to be output continuously. The serial data converter 166a and serial data converter 166b prevent any hazard that occurs in multiplexer switching, by picking up the first one bit of subsequent data at the time of outputting the last one bit.

When output of a specified number of bits is completed, the output controller 166d outputs an output completion signal to the overall control state machine 167 and waits until the start signal is turned off.

The output controller 166d transmits a non-print data signal automatically whenever the system makes a transition to a write state before an output completion signal is output. That is, if a print data signal of the next line is input before print operation for the current line is completed, the print operation of the current line is appropriately ended to protect the system.

The output controller 166d outputs an enable signal, a load signal, and a load/shift clock signal to the thermal head 17 in synchronization with a frequency divided clock signal (a clock signal acquired by frequency division of a system clock) input from the head driving signal generating circuit 15, and outputs a clock signal correspondingly to these signals, to the thermal head 17.

Figure 22:
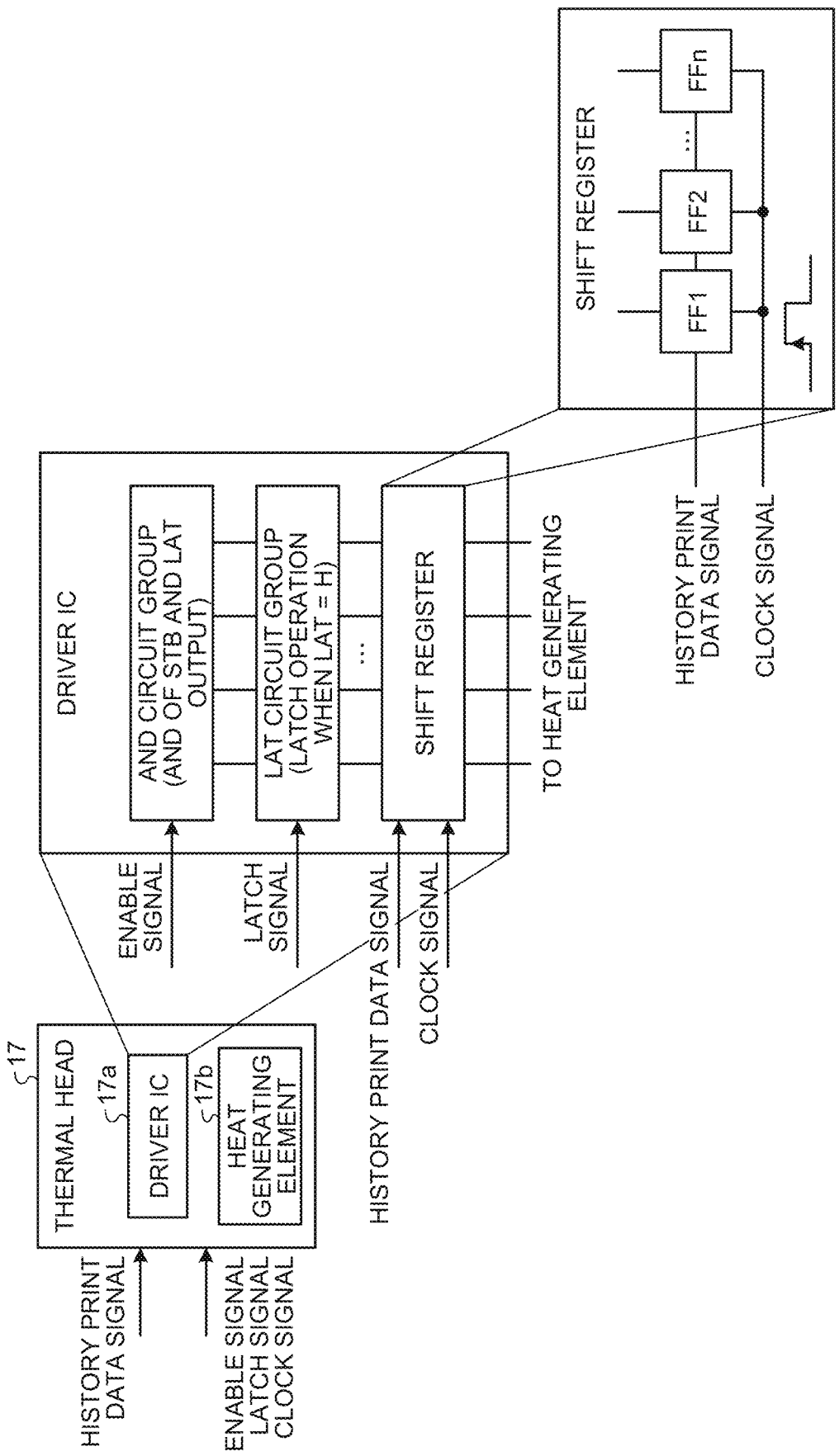
FIG. 22 is a diagram illustrating an example of a configuration of a driver IC according to the embodiment.
Figure 23:
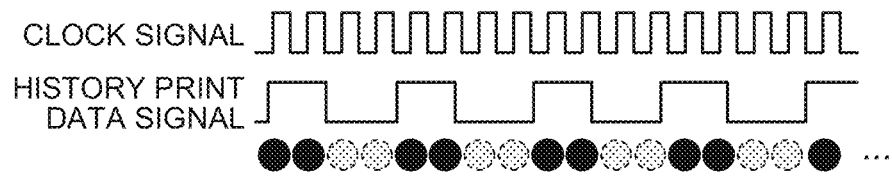
FIG. 23 is a diagram illustrating an example of each signal input to the driver IC.

A clock signal input to the thermal head 17 serves as a signal for inputting data into a shift register included in the thermal head 17. FIG. 22 is a diagram illustrating an example of a configuration of a driver IC according to the embodiment. FIG. 23 is a diagram illustrating an example of each signal input to the driver IC.

As illustrated in FIG. 22, the shift register of the thermal head 17 includes plural flip-flops. The shift register inputs and holds data in the flip-flops (hereinafter, referred to as "FF1 to FFn", as appropriate) in the shift register at a rising edge of a pulse of a clock signal, like it is done with a clock signal input to the interface circuit 16.

Each flip-flop outputs a signal input and held, at a rise of a clock signal. Therefore, when one pulse of a clock signal is input, data in a history print data signal are shifted one by one as follows: FF1→FF2→ . . . →FFn. That is, if the shift register has 64 bits, the history print data signal is updated by input of 64 clock pulses. In a case where a clock signal and a history print data signal illustrated in FIG. 23 are input, data in the history print data signal are shifted one by one between FF1, FF2, . . . , and FFn and the data "110011001 . . . " are shifted as follows: FF1→ . . . →FFn.

A clock signal input to the interface circuit 16 and a clock signal input to the thermal head 17 have the same number of pulses (as they both represent the number of dots), but have different frequencies and phases. The frequency of a clock signal is determined by circuit characteristics of the interface circuit 16 and driver IC 17a.

Figure 25:
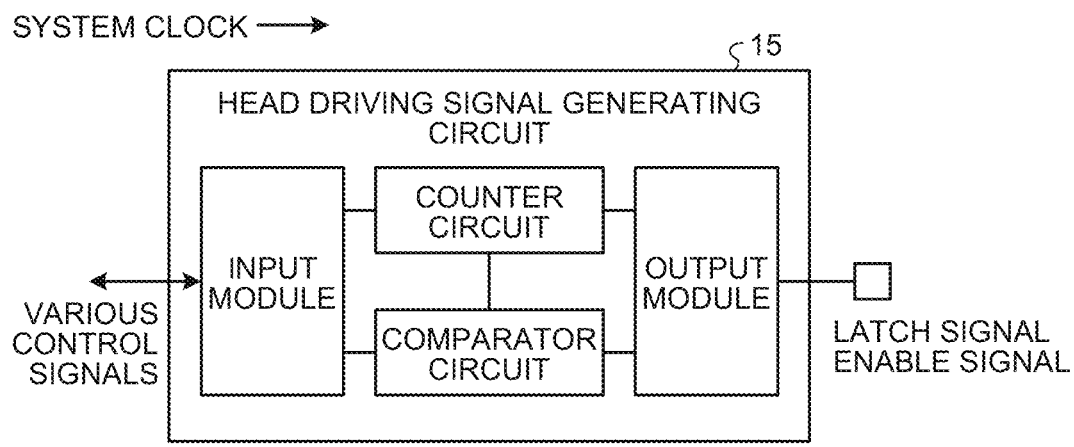
FIG. 25 is a diagram illustrating an example of a configuration of the head driving signal generating circuit according to the embodiment.

FIG. 24 is a diagram illustrating an example of signals corresponding to one line input to an interface circuit and a thermal head. FIG. 25 is a diagram illustrating an example of a configuration of a head driving signal generating circuit according to the embodiment. In FIG. 24, time runs from the left to the right of the figure.

A illustrated in FIG. 24, a latch signal is input after a history print data signal and a clock signal are input. When an output completion signal is input from the history data-serial data conversion clock synchronizer 166 to the overall control state machine 167, an enable signal for latch signal output is output from the overall control state machine 167 to the head driving signal generating circuit 15. The enable signal may be substituted by a first history pulse signal. The head driving signal generating circuit 15 turns the latch signal to input (=L) after a delay time period that has been specified beforehand from reception of the enable signal, and after an ON time period that has been specified beforehand, turns the latch signal off (=H) and outputs an output completion signal for the latch signal, to the overall control state machine 167. The overall control state machine 167 receives input of the output completion signal and completes the operation by turning the enable signal off.

By turning the enable signal for the thermal head 17 off, heat generation by the thermal head 17 (the heat generating element 17b) is able to be turned off regardless of the history print data signal. When the enable signal is turned on, heat generation by the thermal head 17 is able to be turned on for a time period in which the enable signal is on, on the basis of the history print data signal. In thermal history control, heat generation by the thermal head 17 is turned on and off according to the history print data signal. Therefore, the enable signal is turned on after the latch signal for the first data transfer in one line, and this time period is the same as the longest time period of the history pulse signals. In thermal history control, the enable signal is turned off: during transfer of the first data of each line; or when heat generation by the thermal head 17 is turned off. An enable signal to be output from the interface circuit 16 is output with a delay from the enable signal input to the interface circuit 16, the delay corresponding to a transfer time period for the history print data signal and an arithmetic operation time period for the first divided print data signal. That is, since the arithmetic operation time period for the first divided print data signal is quite short, the enable signal output from the interface circuit 16 is delayed substantially by the transfer time period for the history print data signal.

The head driving signal generating circuit 15 includes, as illustrated in FIG. 25, an input module, a counter circuit, a comparator circuit, and an output module, and outputs a latch signal and an enable signal from the output module such that the latch signal and enable signal have specified pulse shapes by use of the counter circuit.

The head driving signal generating circuit 15 receives input of an enable signal output from the overall control state machine 167 and turns a latch signal to input (=L) after a delay time period that has been specified beforehand. Subsequently, the head driving signal generating circuit 15 turns the latch signal off (=H) after an ON time period that has been specified beforehand, and outputs an output completion signal for the latch signal, to the overall control state machine 167. The overall control state machine 167 receives input of the output completion signal from the head driving signal generating circuit 15, and turns the enable signal off, thereby completing the operation.

Specifically, for a latch signal, a counter in the counter circuit is turned on by an enable signal input from the overall control state machine 167, the enable signal being for latch signal output. Thereafter, system clocks are counted, the count and a delay time period held (specified) in the input module are compared to each other, and the output module is turned on if the count is equal to the held (specified) value. Thereafter, system clocks are counted, the count and an ON time period held (specified) in the input module are compared to each other, the output module is turned off if the count is equal to the held (specified) value, and an output completion signal for the latch signal is output to the overall control state machine 167. In contrast, for an enable signal, when an enable signal is input to the interface circuit 16 (on→off/off→on) to the interface circuit 16, the counter of the counter circuit is turned on. Thereafter, system clocks are counted, the count and a delay time period held (specified) in the input module are compared to each other, and the output module is turned into a state (on or off) that is the same as that of the enable signal that has been input if the count is equal to the held (specified) value.

The thermal head 17 may be driven theoretically by a method in which an enable signal that drives the thermal head 17 in thermal history control is turned on when printing of the first print line is started and turned off when printing of the last print line is ended, without being repeatedly turned on and off per print line. However, in this case, if incorrect data are transmitted due to noise, for example, a resistor may be overheated too much and the head may be damaged. Therefore, repetition of switching between on and off per line at a pulse width corresponding to the maximum rating is desirable.

The overall control state machine 167 functions as an operation controller that integrally controls the operating state of the interface circuit.

Write State

When the overall control state machine 167 detects input of a clock signal and a print data signal on the basis of the detection signal, the overall control state machine 167 makes a transition to a write state for the history memory 162.

When conversion of the print data signal to divided print data signals is completed on the basis of the detection signal, the overall control state machine 167 outputs a write signal to the IF data controller 163 to perform writing.

If the conversion from the print data signal to the divided print data signals is not completed, the overall control state machine 167 waits until the conversion is completed.

When an end signal from the IF data controller 163 is input or a latch signal is input, the overall control state machine 167 makes a transition to a read state.

Read State

Figure 26:
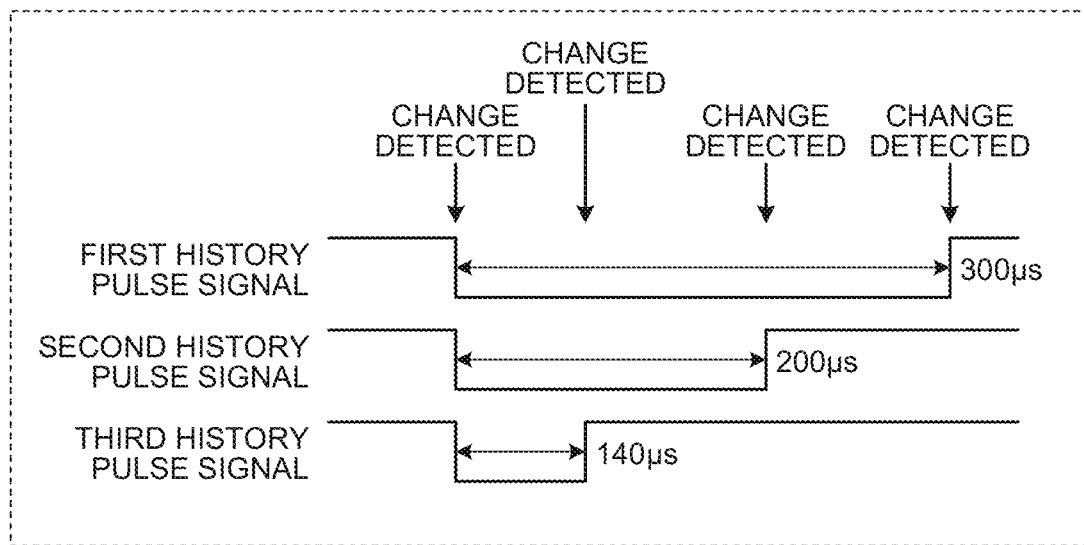
FIG. 26 is a diagram illustrating an example of changes to history pulse signals according to the embodiment.

The overall control state machine 167 waits until a change in a history pulse signal is detected. FIG. 26 is a diagram illustrating an example of changes to history pulse signals according to the embodiment. As illustrated in FIG. 26, when a change in a history pulse signal is detected, the overall control state machine 167 proceeds to arithmetic operations for generating history data, stores a logical value of the history pulse signal as the current history pulse signal, and outputs the logical value to the arithmetic bit logical arithmetic module 165.

Subsequently, the overall control state machine 167 causes the IF data controller 163 to operate in a read state, performs arithmetic operations, and performs conversion of a print data signal. When an end signal is input from the history data-serial data conversion clock synchronizer 166, the overall control state machine 167 outputs a latch signal output signal.

If input of a clock signal and a print data signal is detected in a read standby state, the overall control state machine 167 makes a transition to a write state for the memory.

When input of a clock signal and a print data signal is detected during arithmetic operations, the overall control state machine 167 causes the history data-serial data conversion clock synchronizer 166 and the head driving signal generating circuit 15 to make a transition to an auto-clear state and makes a transition to the write state. In the auto-clear state, data for the thermal head 17 are all changed to non-heat-generating.

As described above, by installation of the interface circuit 16 according to the embodiment in the thermal printer 1, using a signal that is the same as a signal that drives the thermal head 17 facilitates execution of thermal history control. That is, when the interface circuit 16 obtains a print data signal obtained from the CPU 11, the interface circuit 16 divides the print data signal obtained into pieces each having a predetermined bit width, accumulates the divided pieces into a memory (the history memory 162), and performs arithmetic operations with history data by sequentially reading the divided print data signals. The memory for holding the print data signal is thereby able to be reduced. The interface circuit 16 also sequentially reads the arithmetically operated history data from a memory (the arithmetic bit FF group 164), converts them into a history print data signal (serial data) for thermal history control, and sequentially outputs the history print data signal, in synchronization with a drive signal for the thermal head 17, to the thermal head 17. Response performance to input of a print data signal is thereby able to be maintained.

As described above, by the installation of the interface circuit 16 in the thermal printer 1, arithmetic operations with data for thermal history control and synchronization with each signal for driving the thermal head 17 are concurrently and parallelly performed, with the print data signal being limited to an appropriate size, and the response performance to input signals is thereby able to be maintained as much as possible while avoiding increase in the circuit size as much as possible.

FIG. 27 is a diagram for comparison of elements between a thermal printer according to the embodiment and a thermal printer according to a comparative example. The thermal printer according to the comparative example illustrated in FIG. 27 corresponds to a CPU-processing-type thermal printer (for example, see Patent Literature 1) that implements synchronization between conversion of a print data signal to data for thermal history control and driving of the thermal head, by control using software.

Circuit size and memory size written in FIG. 27 are elements related to the cost of the thermal printers. Data change speed and data conversion technique written in FIG. 27 are elements related to printing speed of the thermal printers. External signal responding speed and flexibility of circuit according to change in number of dots written in FIG. 27 are elements related to printing quality of the thermal printers.

As illustrated in FIG. 27, in a case where the interface circuit is implemented by use of an FPGA, for example, in the thermal printer according to the comparative example, when a thermal head with 640 dots is installed, the number of logic elements (the number of LEs) indicating the circuit size is 1000 and when a thermal head with 1920 dots is installed, the number of LEs indicating the circuit size is 2200, and the circuit size thus increases proportionally to the number of dots. Therefore, its utilization is difficult for specifications with a wide printing width or specifications with a high resolution. In contrast, the thermal printer 1 having the interface circuit 16 according to the embodiment installed therein has a constant circuit size regardless of the number of dots in the thermal head. Its utilization is possible for specifications with a wide printing width or specifications with a high resolution.

As illustrated in FIG. 27, when the thermal head having 640 dots is installed in a thermal printer 1 having an interface circuit 16 according to the comparative example installed therein, the number of history stages is set to five, and printing by thermal history control is performed; the memory size is 3840 bits, and the memory size thus increases by the amount of history data that are held. In contrast, when printing is performed by thermal history control under conditions that are the same as those of the comparative example, using the thermal printer 1 having the interface circuit 16 according to the embodiment installed therein; the memory size is 3200 bits and the memory size is thus able to be more compressed than that in the comparative example.

Accordingly, by installation of the interface circuit 16 according to the embodiment in the thermal printer 1, the circuit size of the thermal printer 1 is able to be reduced.

As illustrated in FIG. 27, the thermal printer according to the comparative example has limited data conversion speed due to the processing capacity of the CPU and the occupation time of the bus. In contrast, the data conversion speed of the thermal printer 1 having the interface circuit 16 according to the embodiment installed therein is able to be increased by extending the arithmetic bit width in division of a print data signal and/or executing parallel processing.

As illustrated in FIG. 27, it is difficult for the thermal printer according to the comparative example to process arithmetic operations and output of history data in parallel. In contrast, the thermal printer 1 having the interface circuit 16 according to the embodiment installed therein is able to process them all in parallel.

Accordingly, by the installation of the interface circuit 16 according to the embodiment in the thermal printer 1, the printing speed of the thermal printer 1 is able to be increased.

As illustrated in FIG. 27, the external signal responding speed of the thermal printer according to the comparative example is influenced by a time period for arithmetic operations of history data and a time period for transmission of the history data to the next processing circuit. In contrast, the external signal responding speed of the thermal printer 1 having the interface circuit 16 according to the embodiment installed therein is influenced by a time period for arithmetic operations of history data.

As illustrated in FIG. 27, when the number of dots in the thermal printer according to the comparative example is changed according to a desired resolution, the circuit needs to be changed according to the change in the number of dots. In contrast, even if the number of dots in the thermal printer 1 is changed according to a desired resolution, change in the circuit according to the number of dots is not needed, the thermal printer 1 having the interface circuit 16 according to the embodiment installed therein.

Accordingly, by the installation of the interface circuit 16 according to the embodiment in the thermal printer 1, the printing quality of the thermal printer 1 is able to be improved.

Characteristic embodiments have been described to completely and clearly disclose the techniques according to the appended claims. However, the appended claims are not to be limited to the above described embodiments, and are to be implemented through all modifications and substitutable configurations that can be invented by those skilled in the art within the scope of the basic matter disclosed in this specification.

The invention claimed is:

1. An interface circuit that is connected to both, a system controller that controls a system of a thermal printer, and a driving circuit that controls driving of a heat generating element installed in a thermal head, and that transfers a print data signal and a control signal output from the system controller, to the driving circuit, the interface circuit comprising:
    an operation controller that controls an operation state of the interface circuit;
    a converter that outputs divided print data signals, each divided print data signal of the divided print data signals resulting from division of the print data signal into the divided print data signals each having a predetermined bit width;
    a storage that stores the divided print data signals;
    a data controller that controls an order of each of writing of the divided print data signals into the storage and reading of the divided print data signals from the storage;
    a logical arithmetic module that performs logical arithmetic operations based on the divided print data signals, and a history pulse signal included in the control signal, and generates and outputs a history print data signal that defines heat generating time periods of dots corresponding to print lines that are printed on the basis of the divided print data signals; and
    a conversion clock synchronizer that outputs the history print data signal in synchronization with a driving signal for the thermal head.

2. The interface circuit according to claim 1, wherein the logical arithmetic module has
    a compressed data arithmetic module that generates history data indicating a past printing history and stores the history data into the storage based on the history print data signal corresponding to previously printed plural print lines.

3. The interface circuit according to claim 2, wherein
    the converter divides the print data signal corresponding to print lines into predetermined bit widths, and generates and outputs a first divided print data signal and a second divided print data signal;
    the logical arithmetic module has a history data arithmetic module that
        generates and outputs a first divided history print data signal based on the history data and the first divided print data signal, and
        generates and outputs a second divided history print data signal based on the history data and the second divided print data signal,
    generation and output of the history data by the compressed data arithmetic module is executed in parallel with generation and output of the first divided history print data signal and the second divided history print data signal by the history data arithmetic module; and
    generation and output of the second divided print data signal by the converter is executed in parallel with generation and output of the first divided history print data signal by the logical arithmetic module.

4. The interface circuit according to claim 2, wherein the compressed data arithmetic module
- stores into the storage a history print data signal corresponding to a predetermined number of print lines that includes an immediately preceding line printed immediately before a print line to be printed next, and
- generates the history data resulting from compression of the history print data signal corresponding to past print lines other than the predetermined number of print lines that includes the immediately preceding line, and stores the history data into the storage.

5. A thermal history control method executed in an interface circuit that is connected to both a system controller that controls a system of a thermal printer, and a driving circuit that controls driving of a heat generating element installed in a thermal head, and that transfers a print data signal and a control signal output from the system controller, to the driving circuit, the thermal history control method comprising:
- outputting divided print data signals resulting from division of the print data signal into the divided print data signals, each divided print data signal of the divided print data signals having a predetermined bit width;
- controlling an order of each of writing of the divided print data signals into a storage that stores the divided print data signals and reading of the divided print data signals from the storage;
- performing logical arithmetic operations based on the divided print data signals, and a history pulse signal included in the control signal, and generating and outputting a history print data signal that defines heat generating time periods of dots corresponding to print lines that are printed on the basis of the divided print data signals; and
- outputting the history print data signal in synchronization with a driving signal for the thermal head.

6. The thermal history control method according to claim 5, comprising:
- generating history data indicating a past printing history, and
- storing the history data into the storage based on the history print data signal corresponding to previously printed plural print lines.

7. The thermal history control method according to claim 6, comprising:
- dividing the print data signal corresponding to the print lines into predetermined bit widths, and generating and outputting a first divided print data signal and a second divided print data signal;
- generating and outputting a first divided history print data signal based on the history data and the first divided print data signal;
- generating and outputting a second divided history print data signal based on the history data and the second divided print data signal;
- executing generation and output of the history data in parallel with generation and output of the first divided history print data signal and the second divided history print data signal; and
- executing generation and output of the second divided print data signal in parallel with generation and output of the first divided history print data signal.

8. The thermal history control method according to claim 6, comprising:
- storing into the storage a history print data signal corresponding to a predetermined number of print lines that includes an immediately preceding line printed immediately before a print line to be printed next, and
- generating the history data resulting from compression of the history print data signal corresponding to past print lines other than the predetermined number of print lines that includes the immediately preceding line, and storing the history data into the storage.

\* \* \* \* \*